US010452120B2

(12) United States Patent
Takahashi et al.

(10) Patent No.: US 10,452,120 B2
(45) Date of Patent: Oct. 22, 2019

(54) COMMUNICATION DEVICE, INFORMATION PROCESSING DEVICE, AND COMMUNICATION METHOD

(71) Applicant: SONY CORPORATION, Tokyo (JP)

(72) Inventors: Ryohei Takahashi, Kanagawa (JP); Kazuaki Toba, Kanagawa (JP); Toshihisa Hyakudai, Kanagawa (JP); Hiroshi Morita, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/761,175

(22) PCT Filed: Sep. 21, 2016

(86) PCT No.: PCT/JP2016/077896
§ 371 (c)(1),
(2) Date: Mar. 19, 2018

(87) PCT Pub. No.: WO2017/057152
PCT Pub. Date: Apr. 6, 2017

(65) Prior Publication Data
US 2018/0260013 A1 Sep. 13, 2018

(30) Foreign Application Priority Data
Sep. 30, 2015 (JP) .................................. 2015-194126

(51) Int. Cl.
*G06F 1/3234* (2019.01)
*G06F 1/30* (2006.01)
(Continued)

(52) U.S. Cl.
CPC .............. *G06F 1/3234* (2013.01); *G06F 1/30* (2013.01); *G06F 1/32* (2013.01); *G06F 1/3203* (2013.01);
(Continued)

(58) Field of Classification Search
CPC . G06F 1/3234; G06F 1/32; G06F 1/30; H04B 10/40; H04B 10/25; H04B 10/80; H04B 10/69
See application file for complete search history.

(56) References Cited

U.S. PATENT DOCUMENTS 6,333,801 B1 12/2001 Yoshinaga
6,810,216 B1 * 10/2004 Tourunen ............... H04B 10/40
330/51
(Continued)

FOREIGN PATENT DOCUMENTS

JP 11-177492 A 7/1999
JP 3544932 B2 7/2004
(Continued)

OTHER PUBLICATIONS

International Search Report and Written Opinion of PCT Application No. PCT/JP2016/077896, dated Nov. 29, 2016, 07 pages.
(Continued)

*Primary Examiner* — Leslie C Pascal
(74) *Attorney, Agent, or Firm* — Chip Law Group

(57) ABSTRACT

[Object] To provide a communication device, an information processing device, and a communication method. [Solution] A communication device including: a detector configured to detect an optical signal and convert the optical signal to an electric signal; a data processing unit configured to process the electric signal converted by the detector to acquire data; and a controller configured to control an operating state including a standby state in which the data processing unit is deactivated to reduce power consumption and an active state in which the data processing unit is capable of executing acquisition of the data on a basis of the optical signal detected by the detector, in which the detector detects the optical signal in the standby state.

14 Claims, 14 Drawing Sheets

(51) Int. Cl.
    *G06F 1/32*     (2019.01)
    *H04B 10/69*     (2013.01)
    *H04B 10/25*     (2013.01)
    *H04B 10/40*     (2013.01)
    *H04B 10/80*     (2013.01)
    *G06F 1/3203*     (2019.01)

(52) U.S. Cl.
    CPC ......... *H04B 10/25* (2013.01); *H04B 10/2503* (2013.01); *H04B 10/40* (2013.01); *H04B 10/69* (2013.01); *H04B 10/80* (2013.01)

(56) References Cited

U.S. PATENT DOCUMENTS

| | | |
|---|---|---|
| 2002/0046355 A1 | 4/2002 | Takeuchi |
| 2007/0196112 A1 | 8/2007 | Crews |
| 2015/0023660 A1* | 1/2015 | Kramer ................ H04B 10/564 398/38 |
| 2015/0271753 A1 | 9/2015 | Matsuda |
| 2017/0103647 A1* | 4/2017 | Davis .................... G06F 1/3287 |

FOREIGN PATENT DOCUMENTS

| | | |
|---|---|---|
| JP | 2015-180030 A | 10/2015 |
| JP | 6241613 B2 | 12/2017 |
| KR | 10-2008-0096573 A | 10/2008 |
| TW | 200803203 A | 1/2008 |
| WO | 2007/100612 A1 | 9/2007 |

OTHER PUBLICATIONS

Extended European Search Report of EP Patent Application No. 16851326.5, dated May 7, 2019, 09 pages.

* cited by examiner

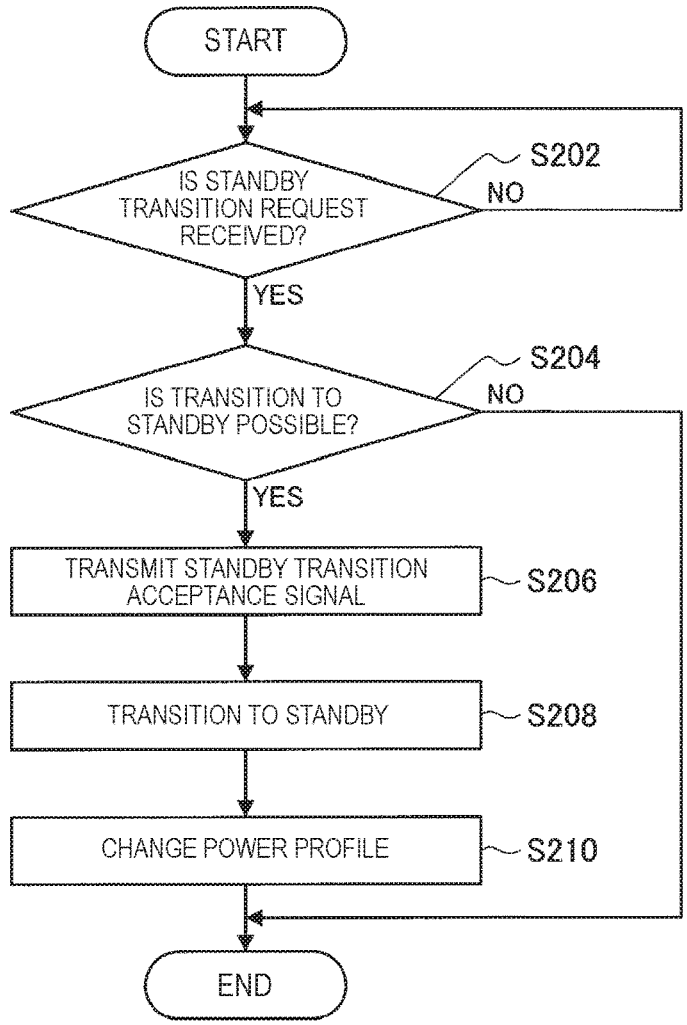
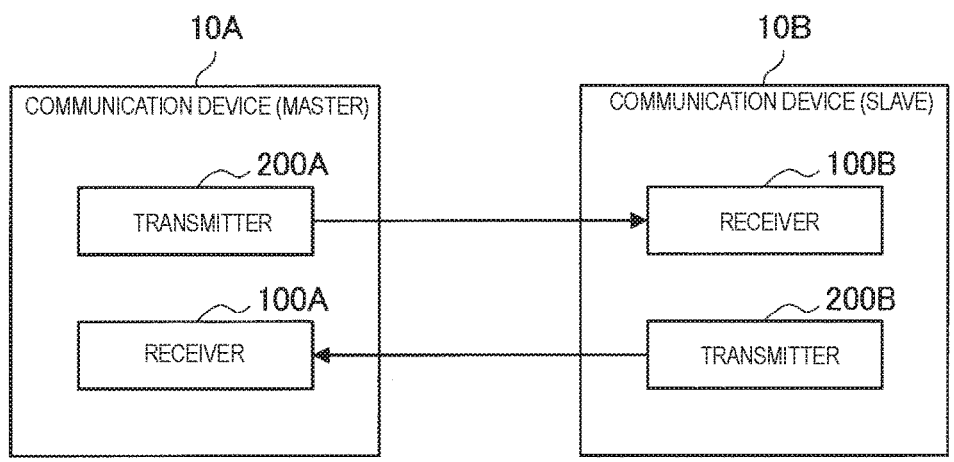

COMMUNICATION DEVICE, INFORMATION PROCESSING DEVICE, AND COMMUNICATION METHOD

CROSS REFERENCE TO RELATED APPLICATIONS

This application is a U.S. National Phase of International Patent Application No. PCT/JP2016/077896 filed on Sep. 21, 2016, which claims priority benefit of Japanese Patent Application No. JP 2015-194126 filed in the Japan Patent Office on Sep. 30, 2015. Each of the above-referenced applications is hereby incorporated herein by reference in its entirety.

TECHNICAL FIELD

The present disclosure relates to a communication device, an information processing device, and a communication method.

BACKGROUND ART

An optical interface cable (optical IF cable) has been recently used as a transmission medium in order to achieve a higher transmission speed. Network equipment, which is connected by the optical IF cable and provided with an optical interface (optical IF), is liable to increase power consumption due to transmission or reception of an optical signal.

In view of this, in one example, Patent Literature 1 discloses a technique of reducing power consumption by performing modulation and outputting at a level that does not cause trouble in communication depending on transmission data. In addition, Patent Literature 2 discloses a technique of reducing power consumption by performing transition between four states of active, idle, passive, and off.

CITATION LIST

Patent Literature

Patent Literature 1: JP 2012-060298A

DISCLOSURE OF INVENTION

Technical Problem

In the technique disclosed in Patent Literature 1, however, data communication is necessary to be maintained continuously, and so power for the data communication is consumed. In addition, in the technique disclosed in Patent Literature 2, even in the passive state reducing power consumption, the optical IF outputs a pulse used to notify an optical IF of equipment connected thereto that the optical IF outputting the pulse is in the passive state, resulting in consuming power to output the pulse. In communication using optical IF having such mechanism, it is desired to further reduce power consumption.

In view of this, the present disclosure provides a novel and improved communication device, information processing device, and communication method, capable of further reducing power consumption.

Solution to Problem

According to the present disclosure, there is provided a communication device including: a detector configured to detect an optical signal and convert the optical signal to an electric signal; a data processing unit configured to process the electric signal converted by the detector to acquire data; and a controller configured to control an operating state including a standby state in which the data processing unit is deactivated to reduce power consumption and an active state in which the data processing unit is capable of executing acquisition of the data on a basis of the optical signal detected by the detector, in which the detector detects the optical signal in the standby state.

Further, according to the present disclosure, there is provided an information processing device including: a detector configured to detect an optical signal and convert the optical signal to an electric signal; a data processing unit configured to process the electric signal converted by the detector to acquire data; and a controller configured to control an operating state including a standby state in which the data processing unit is deactivated and an active state in which the data processing unit is capable of executing acquisition of the data on a basis of the optical signal detected by the detector, in which the detector detects the optical signal in the standby state.

Further, according to the present disclosure, there is provided a communication method executed by a communication device including a detector configured to detect an optical signal and convert the optical signal to an electric signal and a data processing unit configured to process the electric signal converted by the detector to acquire data, the method including: controlling an operating state including a standby state in which the data processing unit is deactivated and an active state in which the data processing unit is capable of executing acquisition of the data on a basis of the optical signal detected by the detector.

Advantageous Effects of Invention

According to the present disclosure as described above, it is possible to achieve a significant reduction in power consumption.

Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 7 is a flowchart illustrating an example of an operation procedure according to the present embodiment.

FIG. 8 is a diagram illustrated to describe a connection configuration in an example of a transition operation.

MODE(S) FOR CARRYING OUT THE INVENTION

Figure 1:
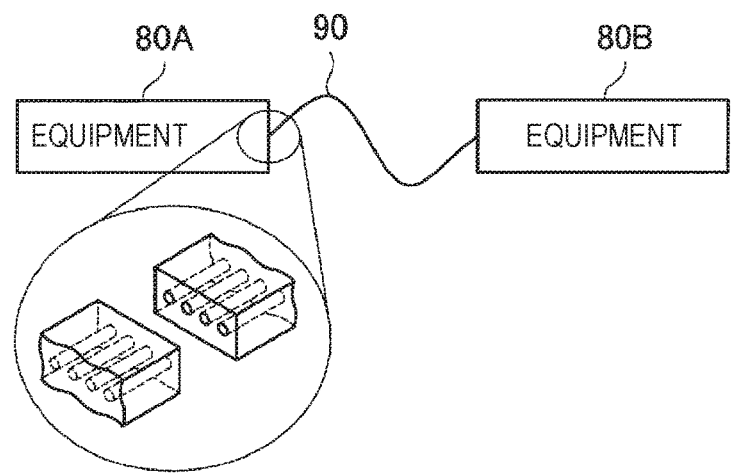
FIG. 1 is a diagram illustrated to describe an overview of an embodiment of the present disclosure.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that, in this description and the drawings, structural elements that have substantially the same function and structure are sometimes distinguished from each other using different alphabets after the same reference sign. However, when there is no need in particular to distinguish structural elements that have substantially the same function and structure, the same reference sign alone is attached.

Moreover, the description will be given in the following order.
<<1. Overview>>
<<2. Configuration>>
<<3. Operation>>
<3-1. Operating State>
<3-2. Transition to Standby State>
<3-3. Transition to Active State>
<3-4. Specific Example>
<<4. Modifications>>
<4-1. Modification 1>
<4-2. Modification 2>
<<5. Exemplary Hardware Configuration>>
<<6. Closing Remarks>>

1. OVERVIEW

An overview of one embodiment of the present disclosure will be first described with reference to FIG. 1. FIG. 1 illustrates equipment 80A and equipment 80B, each of which has an optical interface (optical IF) that is a communication device according to the present embodiment, and they are connected to each other by an optical IF cable 90. Moreover, the description will be given below on the assumption that the optical IFs of the equipment 80A and the equipment 80B are normally connected by the optical IF cable 90 and there is no pulling-out or disconnection of the cable.

The equipment 80A and the equipment 80B are information processing devices having the optical IF, and they may be, in one example, TV (television set), video recorder, personal computer (PC), tablet PC, in-vehicle terminal, or the like.

The optical IF cable 90 having an optical fiber transmits an optical signal between the equipment 80A and the equipment 80B. Moreover, the configuration of the surface at which the optical IF cable 90 and the equipment 80A are connected is not limited to the example schematically illustrated in FIG. 1. In one example, the optical IF cable 90 may have a power cord for supplying power, and the power may be supplied from the one equipment connected by the optical IF cable 90 to the other equipment via the power cord.

Further, FIG. 1 illustrates an example in which the pieces of equipment are connected by one optical IF cable 90. However, the pieces of equipment may be connected by two optical IF cables so that one optical IF cable may be used for transmission from the equipment 80A and the other optical IF cable may be used for transmission from the equipment 80B.

Figure 2:
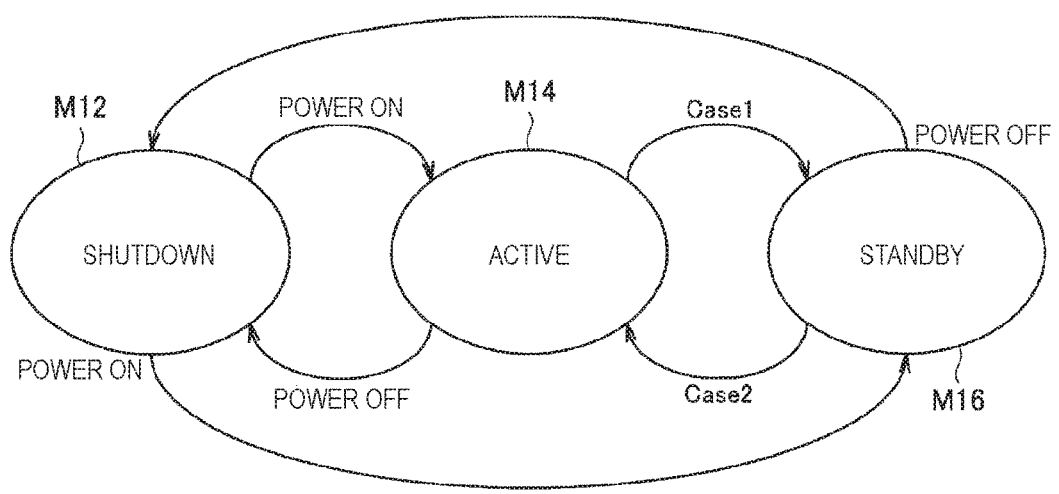
FIG. 2 is a schematic diagram illustrated to describe transition between operating states of a communication device according to the present embodiment.

The communication device (optical IF) according to the present embodiment reduces power consumption by performing the transition between a plurality of operating states. The operating states of the communication device according to the present embodiment will be described with reference to FIG. 2. FIG. 2 is a schematic diagram illustrated to describe the transition between the operating states of the communication device according to the present embodiment.

The steady state of the communication device (optical IF) according to the present embodiment includes two states, that is, a shutdown state in which no power is supplied and a power-on state in which power is supplied. Furthermore, the power-on state is divided into an active state and a standby state. The active state is a state in which normal communication is performed, and the standby state is a state in which low power consumption is achieved by limiting a function of communication or the like.

In the connection between the two pieces equipment as illustrated in FIG. 1, the combination of the operating states in the steady state (except during the transition between the operating states) in the case where both pieces of equipment are in the power-on state may be, in one example, two patterns as follows:

Pattern 1: optical IF of equipment 80A is active and optical IF of equipment 80B is active Pattern 2: optical IF of equipment 80A is in standby and optical IF of equipment 80B is standby.

When a power-off operation is performed in the active state M14 illustrated in FIG. 2, the communication device performs the transition to the shutdown state M12. Then, when the power-on operation is performed, the communication device performs the transition from the shutdown state M12 to the active state M14 or the standby state M16. In addition, similarly to the above, when the power-off operation is performed in the standby state M16, the communication device performs transition to the shutdown state M12. Then, when the power-on operation is performed, the communication device performs transition from the shutdown state M12 to the active state M14 or the standby state M16.

In the case where the communication device according to the present embodiment is in the active state M14, the communication device according to the present embodiment may perform transition from the active state M14 to the standby state M16 in response to a request from another communication device (Case 2 shown in FIG. 2). In addition, when the communication device according to the present embodiment is in the standby state M16, the communication device according to the present embodiment may perform transition from the standby state M16 to the active state M14 in response to a request from another communication device (Case 2 shown in FIG. 2).

Moreover, the transition between the standby state M16 and the active state M14 may be performed at a speed higher than that of the transition between the shutdown state M12 and the active state M14. In addition, the power on/off operation is directly performed, in one example, on the communication device according to the present embodiment or on equipment having the communication device, but the transition between the standby state M16 and the active state M14 is may be performed in response to a request from another communication device as described above.

Such a configuration makes it possible for the communication device according to the present embodiment to reduce the power consumption in a state where it is not necessary to perform normal communication. The configuration of the present embodiment having such effects will be described below in detail.

2. CONFIGURATION

Figure 3:
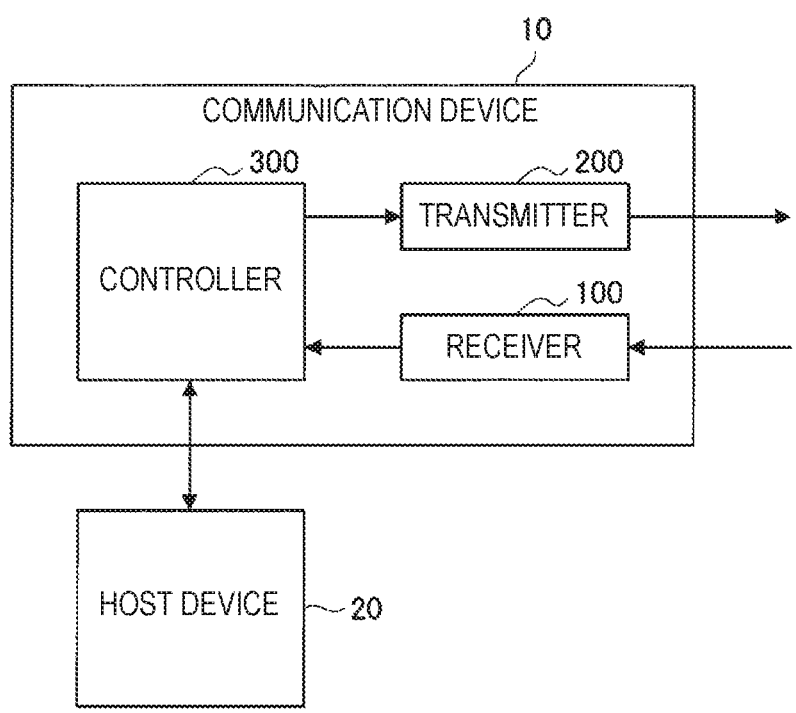
FIG. 3 is a block diagram illustrating an exemplary configuration of a communication device 10 according to the present embodiment.

An exemplary configuration of the communication device (optical IF) according to the present embodiment will be described below with reference to FIGS. 3 and 4. FIG. 3 is a block diagram illustrating an exemplary configuration of a communication device 10 according to the present embodiment. In FIG. 3, the communication device 10 is a device that performs interface processing on an external device of a host device 20, which is an information processing device, and an external network.

In one example, the communication device 10 transmits information transmitted from the host device 20 to an external device or an external network, or receives information from an external device or an external network and supplies it to the host device 20.

The host device 20 is an information processing device such as a television, a video recorder, a personal computer (PC), a tablet PC, and an in-vehicle terminal. The host device 20 communicates with another device via a network (e.g., the optical IF cable 90 illustrated in FIG. 1).

Moreover, although the communication device 10 and the host device 20 are illustrated in FIG. 3 to be configured as separate units, the present disclosure is not limited to this example, and these devices may have any configuration as long as they are connected to each other in such a relationship substantially illustrated in FIG. 3. In one example, the communication device 10 and the host device 20 may be configured as an integral unit, or in one example, the communication device 10 may be formed as an expansion card or the like and detachably connected to a predetermined interface of the host device 20.

The communication device 10 includes a receiver 100, a transmitter 200, and a controller 300 as illustrated in FIG. 3.

The receiver 100 illustrated in FIG. 3 is an optical receiver configured to receive an optical signal from another communication device (hereinafter also referred to as an opposite communication device) connected to the communication device 10 via the optical IF cable 90 described with reference to FIG. 1. The receiver 100 operates under the control of a controller 300, which will be described later, converts an optical signal received from the opposite communication device into an electric signal or data, and provides it for the controller 300.

The receiver 100 according to the present embodiment functions as a receiver channel (Rx ch). The Rx ch is a channel that receives a signal sent from a transmitter channel (Tx ch) of the opposite communication device. Moreover, a substream link channel that is a channel for receiving a control signal or the like and a mainstream link channel that is a channel for receiving content data such as video and sound are allocated the Rx ch.

The description will be given by focusing on an analog front-end of the receiver 100 with reference to FIG. 4. FIG. 4 is a block diagram illustrating an exemplary configuration of the analog front-end of the receiver 100. The receiver 100 illustrated in FIG. 4 includes at least a detector 110 that detects an optical signal and converts the optical signal into an electric signal and a data processing unit 130 that processes the electric signal converted by the detector 110 to acquire data.

Figure 4:
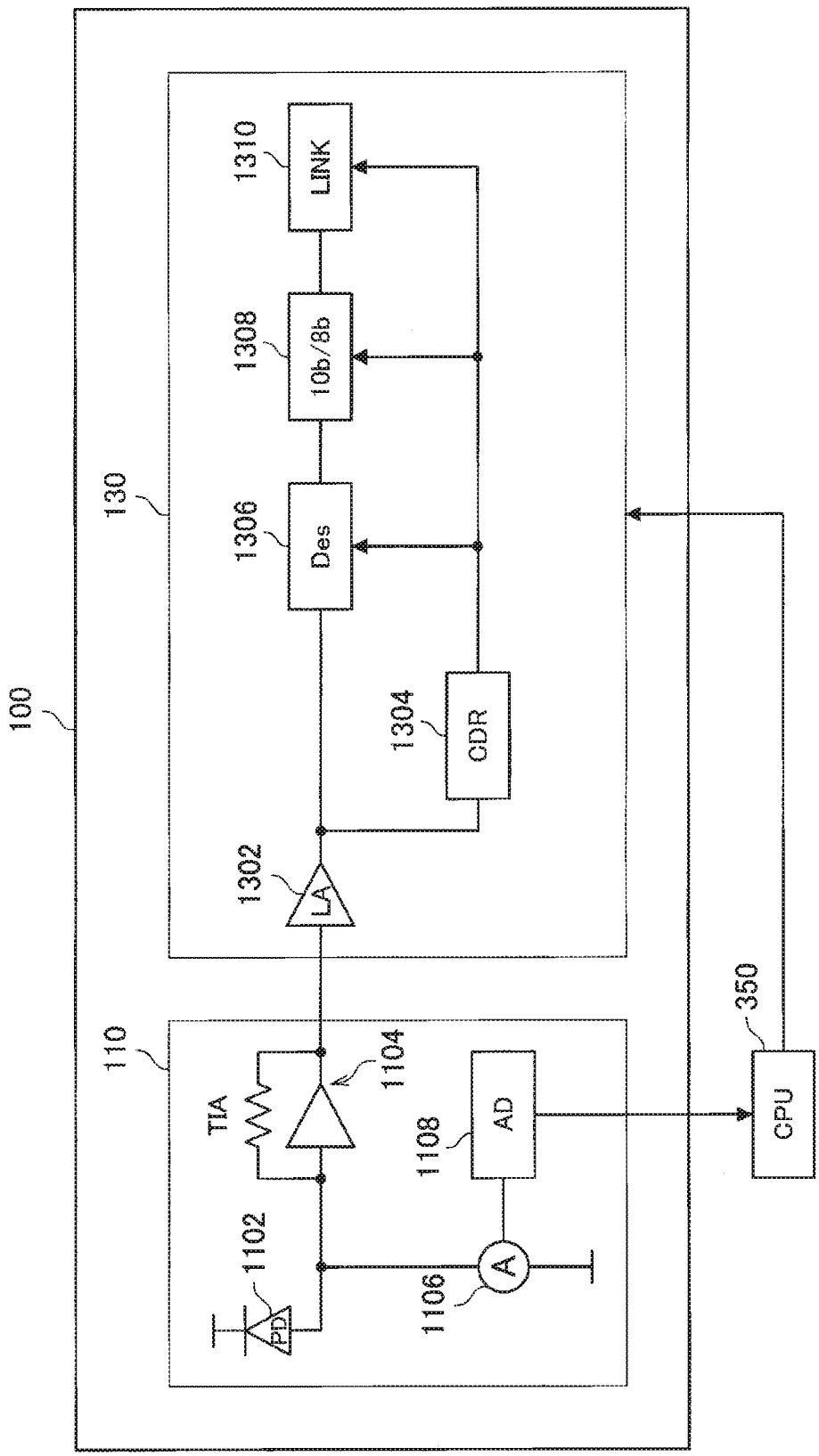
FIG. 4 is a block diagram illustrating an exemplary configuration of an analog front-end of a receiver 100 according to the present embodiment.

Further, a central processing unit (CPU) 350 illustrated in FIG. 4 is incorporated in the communication device 10, functions as an arithmetic processing unit and a control unit, and controls the overall operation in the communication device 10 in accordance with various programs. In one example, the CPU 350 allows the controller 300 described later to fulfill its functions in cooperation with read-only memory (ROM) or random-access memory (RAM) not shown.

The detector 110 has a photo detector (PD) 1102, a transimpedance amplifier (TIA) 1104, a current detector 1106, and an A/D converter 1108, as illustrated in FIG. 4. The PD 1102 detects the light to acquire the current. The TIA 1104 converts the current acquired by the PD 1102 into an electric signal having a voltage, and provides it for the data processing unit 130. In addition, the current detector 1106 detects a current value acquired by the PD 1102, and the detected current value is converted to digital data by the A/D converter 1108 and is provided for the CPU 350.

The detector 110 may detect an optical signal in both the standby state and active state. In addition, the detector 110 may perform an intermittent operation capable of detecting an optical signal at least every predetermined period of time in the standby state, as described later. Such a configuration makes it possible to reduce the power consumption to be consumed by the operation of the detector 110 in the standby state.

The data processing unit 130 includes a limiting amplifier (LA) 1302, a clock data recovery (CDR) 1306, a deserializer 1306, a 10b/8b converter 1308, and a link converter (LINK) (block for conversion to link layer) 1310, as illustrated in FIG. 4. The electric signal acquired by the detector 110 is processed by the data processing unit 130, and the data obtained by the data processing unit 130 is provided for the controller 300 to be described later.

The data processing unit 130 according to the present embodiment is activated and is capable of executing data acquisition in the active state, but the data processing unit 130 is deactivated to reduce power consumption in the standby state. Such a configuration makes it possible to eliminate the necessity for the operation of the LA 1302 and the CDR 1306 having relatively large power consumption in the standby state. Thus, it is possible to reduce power consumption to, in one example, about 1/10, as compared with the case of the active state.

The transmitter 200 illustrated in FIG. 3 is an optical transmitter that outputs an optical signal to another communication device (the opposite communication device) connected to the communication device 10 via the optical IF cable 90 described with reference to FIG. 1. The transmitter 200 operates under the control of the controller 300, and, in one example, converts data into an optical signal and transmits it to the opposite communication device. In addition, the transmitter 200 transmits an optical signal, which is used to control the operating state of the opposite communication device, or transmits an optical signal, which indicates that the transition between the operating states of the communication device 10 is accepted, to the opposite communication device, under the control of the controller 300.

The transmitter 200 according to the present embodiment functions as Tx ch. The Tx ch is a channel for sending a signal to the Rx ch of the opposite communication device. Moreover, a substream link channel that is a channel for sending a control signal or the like and a mainstream link channel that is a channel for sending content data or the like such as video and audio are allocated to the Tx ch.

The controller 300 performs control of the entire communication device 10. In one example, the controller 300 controls the operating states, which include the standby state and the active state, of the communication device 10 on the basis of the optical signal detected by the detector 110.

In one example, the controller 300 determines whether the optical signal detected by the detector 110 in the standby state is an active transition request signal requesting the communication device 10 to transition to the active state on the basis of the average power of the optical signal. Furthermore, in a case where the controller 300 determines that the optical signal is the active transition request signal, the controller 300 may cause the communication device 10 to transition from the standby state to the active state. Such a configuration makes it possible for the controller 300 to control the transition from the standby state to the active state without causing the data processing unit 130 to process the optical signal. Thus, it is possible to deactivate the data processing unit 130 in the standby state, thereby reducing the power consumption, as described above.

Moreover, the average power refers to the power at the amplitude center of a signal at a specific time interval. The specific time interval herein may be, in one example, an interval of time necessary for transmitting data corresponding to 10 bits. The average power may be sometimes simply referred to as a power, hereinafter.

In this regard, in one example, there may be a case where the optical signal detected by the detector 110 in the standby state is an optical signal having the average power equal to or more than predetermined optical power, which continues for a predetermined time or longer. In this case, the controller 300 may determine that the optical signal is the active transition request signal. Such a configuration allows the communication device 10 and the opposite communication device to prevent from outputting the optical signal having the average power equal to or more than the predetermined optical power in the standby state, thereby maintaining the standby state. In other words, the controller 300 may control the transmitter 200 so that the transmitter 200 is prevented from transmitting the active transition request signal in the standby state as described later. Thus, the necessity for outputting the optical signal to maintain the standby state is eliminated, thereby further reducing the power consumption.

Further, the controller 300 determines whether the optical signal detected by the detector 110 in the active state is a standby transition request signal requesting the communication device 10 to the transition to the standby state on the basis of the average power of the optical signal. Furthermore, in the case where the controller 300 determines that the optical signal is the standby transition request signal, the controller 300 may cause the communication device 10 to transition from the active state to the standby state. Such a configuration makes it possible for the controller 300 to control the transition from the active state to the standby state without causing the data processing unit 130 to process the optical signal. Moreover, the data processing unit 130 will be operating in the active state, and so even in the case where a predetermined control command is included in the data acquired by the data processing unit 130, the controller 300 may cause the communication device 10 to transition from the active state to the standby state.

In this regard, in one example, in a case where the optical signal detected by the detector 110 in the active state is an optical signal having the average power less than the predetermined optical power, which continues for a predetermined time or longer, the controller 300 may determine that the optical signal is the standby transition request signal. In addition, the predetermined optical power and the predetermined time may be set such that the optical signal in the case where normal communication is performed in the active state is prevented from being determined as the standby transition request signal. Such a configuration makes it possible to prevent occurrence of erroneous transition to the standby state in a situation where the transition to the standby state is prohibited.

Further, the controller 300 controls the transmitter 200 so that the transmitter 200 performs transmission to the opposite communication device. In one example, the controller 300 controls the transmitter 200 so that the transmitter 200 transmits the data received from the host device 20 to the opposite communication device. In addition, the controller 300 controls the transmitter 200 so that the transmitter 200 transmits an optical signal used to control the operating state of the opposite communication device or an optical signal indicating that the transition between operating states of the communication device 10 is accepted to the opposite communication device.

In one example, the controller 300 may cause the above-described active transition request signal to be transmitted to the opposite communication device so that the opposite communication device is transitioned from the standby state to the active state. In addition, the controller 300 may cause the above-described standby transition request signal to be transmitted to the opposite communication device so that the opposite communication device is transitioned from the active state to the standby state. Such a configuration makes it possible for the communication device 10 to control the operating state of the opposite communication device, thereby reducing the power consumption of the opposite communication device.

Further, in the case where the optical signal detected by the detector 110 in the standby state is determined to be the active transition request signal, the controller 300 may cause an active transition acceptance signal, which indicates that the transition of the communication device 10 to the active state is accepted, to be transmitted. In addition, in a case where no active transition acceptance signal is included in the optical signal detected by the detector 110 within a predetermined waiting time after starting the transmission of the active transition request signal, the controller 300 may cause the communication device 10 to transition to the standby state. Such a configuration allows, in one example, in a case where one communication device is in a state in which the transition to the active state is prohibited because of being in the shutdown state, another communication device to transition to the standby state, thereby reducing the power consumption.

Further, in the case where the optical signal detected by the detector 110 in the active state is determined to be the standby transition request signal, the controller 300 may determine whether the transition of the communication device 10 to the standby state is possible. Furthermore, in the case where the controller 300 determines that the transition to the standby state is possible, the controller 300 may cause a standby transition acceptance signal, which indicates that the transition of the communication device 10 to the standby state is accepted, to be transmitted. In this regard, the controller 300 may determine whether the transition to the standby state is possible on the basis of contents of communication with the opposite communication device or contents of the operation of the host device 20. In one example, in a case where the communication device 10 receives data from the opposite communication device and records it in the host device 20, the controller 300 may determine that it fails to perform the transition to the standby state. Such a configuration makes it possible to notify the opposite communication device whether the communication device 10 is in a state that is possible to be transitioned to the standby state.

Further, in a case where the standby transition acceptance signal is included in the optical signal detected by the detector 110 within a predetermined waiting time after starting the transmission of the standby transition request signal, the controller 300 may cause the communication device 10 to transition to the standby state. Such a configuration allows the communication device 10 to transition to the standby state only in the case where the opposite communication device is able to transition to the standby state. Thus, in a case where the opposite communication device fails to transition to the standby state, the communication is maintained.

Further, in a case where the optical IF cable 90 described with reference to FIG. 1 has a power cord for supplying power, the controller 300 may control the power supply via the optical IF cable 90. In one example, the controller 300 according to the present embodiment may control the power supply by using a power profile that is a profile indicating how much power is supplied to the opposite communication device or how much power is supplied from the opposite communication device.

3. EXEMPLARY OPERATION

The exemplary configuration of the communication device 10 according to the present embodiment is described above. Subsequently, an exemplary operation of the communication device 10 according to the present embodiment will be described. First, the operating states according to the present embodiment will be described with reference to FIG. 5. Then, an exemplary transition operation from the active state to the standby state and an exemplary transition operation from the standby state to the active state will be described in this order. Furthermore, a specific application example (specific example) of the present embodiment will be described.

3-1. Operating State (Active State)
The active state of the communication device 10 according to the present embodiment is defined as follows using each channel and the power profile described above.

The Tx channel (the transmitter 200) of the substream link outputs an optical signal having the power that is equal to or more than $P_{th\_Tx}$ at least at intervals of time $T_{stb}$ as long as the communication device 10 is in the active state. In addition, the Rx ch (the receiver 100) of the substream link monitors the power of the optical signal that is output from the Tx ch of the corresponding opposite communication device. In addition, the mainstream link performs normal communication for both the Tx ch and Rx ch. In addition, in the case where the opposite communication device performs an operation by power supply via the optical IF cable, the power profile is controlled so that the power necessary for the operation is supplied.

Here, $P_{th\_Tx}$ is a threshold (e.g., 710 uW) of the optical average power indicating the active state that is output from the Tx ch. In addition, time $T_{stb}$ is a predetermined time (e.g., 10 ms) used for the determination of the standby transition request signal that requests the communication device 10 to transition to the standby state by continuously inputting the power that is equal to or less than $P_{th\_Tx}$ to the Rx ch.

Moreover, the standby transition request signal (Stanby Request) is defined as follows for each of the Tx ch and the Rx ch. The standby transition request signal that is output from the Tx ch of the substream link is, in one example, an optical signal having the average power less than the $P_{th\_Tx}$, which continues during the predetermined time $T_{stb}$. In addition, the standby transition request signal that is input to the Rx ch of the substream link is, in one example, an optical signal having the average power less than the $P_{th\_Tx}$, which continues during the predetermined time $T_{stb}$.

In this regard, the reason why the power for the output from the Tx ch and the power for the input to the Rx ch are separately defined is that the transmission loss occurring in the optical IF cables used for connection between the communication devices, their connected components, or the like is taken into consideration. In one example, the power of an optical signal having the power of the $P_{th\_Tx}$ that is output from the Tx ch attenuates to the $P_{th\_Tx}$ at the time of being input to Rx ch. The $P_{th\_Tx}$ is an optical power threshold (e.g., 100 uW) indicating the active state that is input to the Rx ch.

Figure 5:
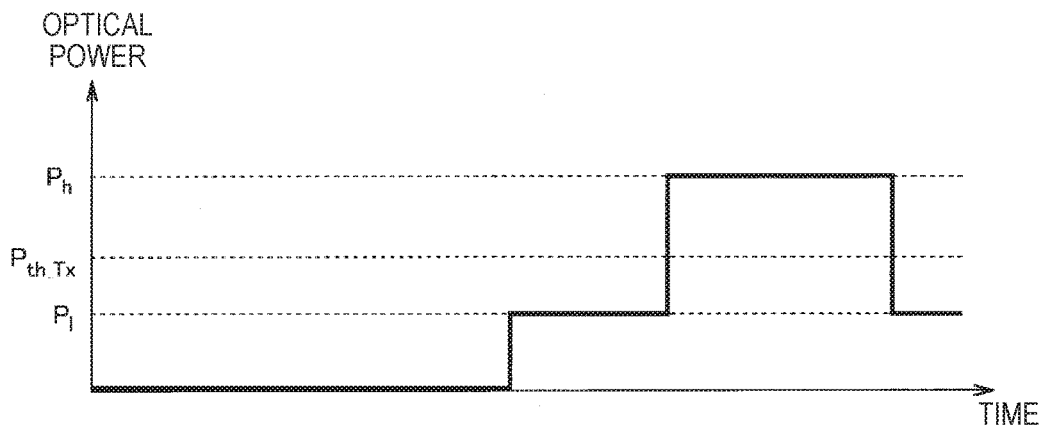
FIG. 5 is a diagram illustrated to describe a relationship between optical powers that are output from Tx ch according to the present embodiment.

Further, although the output power in the Tx ch for the standby transition request signal is less than the $P_{th\_Tx}$, this is because the opposite Rx ch of the substream link can recognize the standby transition request signal even in the case where there is ideally no transmission loss. FIG. 5 is a diagram illustrating the relationship between optical powers that are output from the Tx ch. In FIG. 5, $P_h$ indicates the output power of the Tx ch, which is "1" as a logical value (e.g., 1050 uW), and $P_l$ indicates the output power of Tx ch, which is "0" as a logical value (e.g. 530 uW). As illustrated in FIG. 5, the $P_{th\_Tx}$ may be a value more than the Pi and less than the $P_h$.

In the active state, the Tx ch of the substream link typically notifies the opposite communication device that the communication device 10 is in the active state. In addition, the Rx ch of the substream link detects the optical signal to check whether the opposite communication device is outputting the standby transition request signal for the transition to the standby state.

In the case where the opposite communication device is operating by power supply via the optical IF cable, the power profile is controlled so that the power necessary for the operation is supplied. Such a configuration allows, in the active state, the communication devices of the connected host device to be recognized that they are in the active state mutually and at the same time to be in the state of waiting for a request to perform the transition to the standby state. (Standby State)

The standby state of the communication device 10 according to the present embodiment is defined as follows using each channel and the power profile described above.

The Tx ch (the transmitter 200) of the substream link is in a state of not outputting an optical signal having the power equal to or more than the $P_{th\_Tx}$ to the Rx ch of the opposite communication device. In addition, the Rx ch (the receiver 100) of the substream link is in a state of waiting for the active transition request signal to be output from the Tx ch of the corresponding opposite communication device, and may perform an intermittent operation capable of detecting the optical signal every predetermined period of time $T_{dwn}$ to check the active transition request signal. In addition, in one example, both the Tx ch and Rx ch of the mainstream link are in a communication stop state. In addition, the power profile is controlled so that the minimum power capable of maintaining communication is supplied in the case where the opposite communication device is operating by power supply via the optical IF cable.

Here, $T_{dwn}$ is an intermittent non-operation time (e.g., 1 s) of the Rx ch.

Further, the active transition request signal (Activation Request) requesting the transition from the standby state to the active state is defined as follows for each of the Tx ch and the Rx ch in consideration of the transmission loss in the optical IF cable used for the connection, their connected components, or the like.

The active transition request signal that is output from the Tx ch of the substream link is, in one example, an optical signal having the average power equal to or more than the $P_{th\_Tx}$, which continues during a predetermined time $T_{act}$. In addition, the active transition request signal that is input to the Rx ch of the substream link is, in one example, an optical signal having the average power equal to or more than the $P_{th\_Tx}$, which continues during the predetermined time $T_{act}$.

Here, the predetermined time $T_{act}$ is predetermined time (e.g., 10 ms) used for determination of the active transition request signal. The output power from the substream link Tx ch in the standby state is set to be equal to or less than the $P_{th\_Tx}$ not to be recognized as the active transition request signal in the opposite substream link Rx ch even in the case where there is ideally no transmission loss.

Moreover, in the standby state, the Tx ch of the substream link may stop communication. As described above, in the standby state, the mainstream link is also in the communication stop state, so the transmitter 200 may stop its operation in the standby state. This further increases the effect of reducing the power consumption.

Further, the Rx ch (the receiver 100) of the substream link checks the active transition request signal from the Tx ch of the opposite communication device as described above, so it may operate only intermittently, thereby further reducing the power consumption.

Further, as described with reference to FIG. 4, in the Rx ch in the standby state, only the detector 100 may have the configuration to be activated to check the active transition request signal and so it is possible to stop the operation of the data processing unit 130.

Moreover, in a case where the output value of the A/D converter 1108 described with reference to FIG. 4 exceeds the $P_{th\_Tx}$, the digital value is regarded as "1", and in a case where the "1" is detected, the controller 300 may determine that the active transition request signal is received.

As described above, in the standby state, the mainstream link may be in the communication stop state, and the power consumption is reduced. In addition, the power profile may be controlled to supply the minimum power capable of maintaining the optical communication (e.g., 3.3 V±10%, 500 mA) even in the standby state in the case where the power is supplied to the opposite communication device.

Moreover, in a case where a component that operates regardless of machine-to-machine communication using the communication device 10, in one example, the host device 20 is a video recorder, the configuration of the host device 20 for performing the recording or the like of a terrestrial TV may be operated even in the case where it is in the standby state. The standby state according to the present embodiment means that the communication device 10 is in the standby state, and the host device 20 connected to the communication device 10 is not necessarily in the standby state. It is also possible for the host device 20 to change its operating state in conjunction with the operating state of the communication device 10, or for the communication device 10 to change its operating state in conjunction with the operating state of the host device 20.

As described above, in the standby state, it is possible to restrict the operation and output signals of the Tx ch and the Rx ch of the substream link, and it is possible to stop communication of the mainstream link. Such a configuration makes it possible, in the standby state, to reduce the power consumption significantly as compared with the case of the active state.

3-2. Transition to Standby State

The operating state of the communication device 10 according to the present embodiment is described above in detail. Next, an example of the transition operation from the active state to the standby state (Case 1 in FIG. 2) will be described with reference to FIGS. 6 to 10.

First, conditions under which the transition from the active state to the standby state is performed are defined. In a case where at least one of the following three conditions is satisfied, the transition from the active state to the standby state is performed.

Condition 1: Reception of standby transition request signal from opposite Tx ch by Rx ch of substream link Condition 2: Implementation-dependent condition. Instruction or the like to perform transition to standby state from user, with no transmission of AV data to connection destination device during predetermined time Condition 3: Reception of standby command (control command using substream link)

Moreover, in a case where the transition to the standby state by the control command of Condition 3 is performed, after checking that the opposite Tx ch of the substream link is in the standby state, the transition to the standby state is performed.

Further, the communication device 10, when receiving the standby transition request signal at the time of the transition to the standby state, outputs the standby transition acceptance signal (Accept Standby Response) from the Tx ch if the transition to the standby state is possible. The standby transition acceptance signal is defined as follows, in one example, for each of the Tx ch and the Rx ch.

The standby transition acceptance signal that is output from the Tx ch of the substream link is an optical signal having the average power less than the $P_{th\_Tx}$, which continues during $T_{stb}$. In addition, the standby transition acceptance signal that is input to the Rx ch of the substream link is an optical signal having the average power less than the $P_{th\_Tx}$, which continues during $T_{stb}$.

Here, although the power of the standby transition acceptance signal that is output from the Tx ch is assumed to be less than the $P_{th\_Tx}$, this is because the opposite Rx ch of the substream link can recognize the standby transition acceptance signal even in the case where there is ideally no transmission loss. In the case where the communication device 10 does not receive the standby transition acceptance signal from the Tx ch of the opposite communication device during the predetermined waiting time $T_{wait\_stb}$ after starting the output of the standby transition request signal, the communication device 10 does not perform the transition to the standby state. Thus, the transition for both communication devices is cancelled. Here, the predetermined waiting time $T_{wait\_stb}$ is the upper limit time (e.g., 22 ms) for the communication device that has transmitted the standby transition request signal to wait for reception of the standby transition acceptance signal from the opposite communication device.

Figure 6:
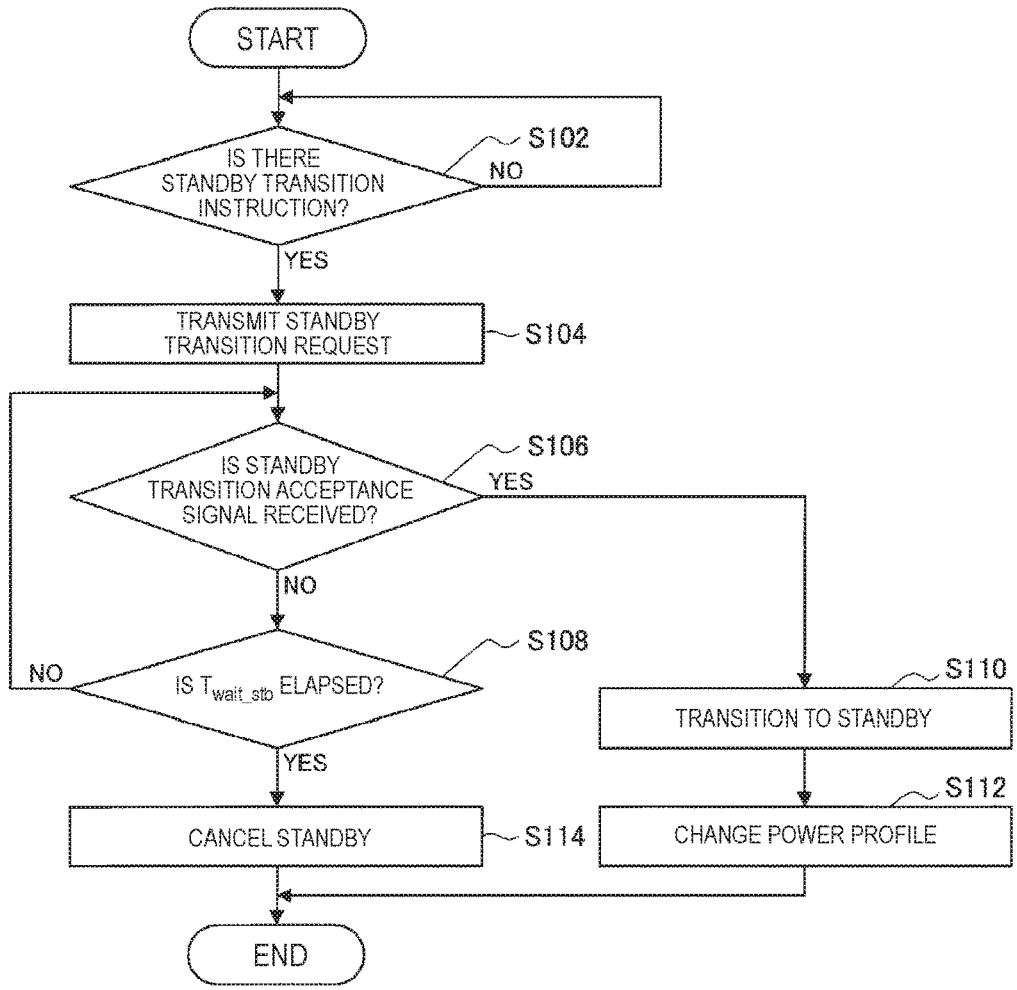
FIG. 6 is a flowchart illustrating an example of an operation procedure according to the present embodiment.

FIG. 6 is a flowchart illustrating an example of an operation procedure in a case where the transition to the standby state is performed by a standby transition instruction from the user. First, the communication device 10 continues to wait for a standby transition instruction from the user (S102). If there is the standby transition instruction from the user (YES in S102), the communication device 10 transmits a standby transition request signal to the opposite communication device (S104). Subsequently, the communication device 10 waits for a standby transition acceptance signal from the opposite communication device (S106). In a case where the standby transition acceptance signal is not received even after the lapse of the predetermined waiting time $T_{wait\_stb}$ (NO in S106 and YES in S108), the communication device 10 cancels the transition to the standby state and continues the normal communication in the active state.

On the other hand, in a case where the communication device 10 receives the standby transition acceptance signal within the predetermined waiting time $T_{wait\_stb}$ (YES in S106), the communication device 10 performs the transition to the standby state (S110). In addition, in a case where the communication device 10 supplies power using the optical IF cable, the communication device 10 may change the power profile depending on the change in the operating state (S112).

FIG. 7 is a flowchart illustrating an example of an operation procedure in the case where the transition to the standby state is performed by the standby transition request signal from the opposite communication device. First, the communication device 10 continues to wait for reception of the standby transition request signal from the opposite communication device (S202). The communication device 10, when receiving the standby transition request signal from the opposite communication device (YES in S202), determines whether the transition to the standby state is possible (S204). In a case where the transition to the standby state is not possible (NO in S204), the communication device 10 does not transmit the standby transition acceptance signal to the opposite communication device and does not perform the transition to the standby state. On the other hand, in a case where the transition to the standby state is possible (YES in S204), the communication device 10 transmits the standby transition acceptance signal to the opposite communication device (S206). Subsequently, the communication device 10 performs the transition to the standby state (S208). In addition, in a case where the communication device 10 supplies power using the optical IF cable, the communication device 10 may change the power profile depending on the change in the operating state (S210).

FIG. 8 is a diagram illustrated to describe the connection configuration in an example of the transition operation described below. A communication device 10A illustrated in FIG. 8 is a communication device on the side that transmits the standby transition request signal or the active transition request signal, and is hereinafter also referred to as a master device. In addition, a communication device 10B illustrated in FIG. 8 is a communication device on the side that receives the standby transition request signal or the active transition request signal, and is hereinafter also referred to as a slave device.

Figure 9:
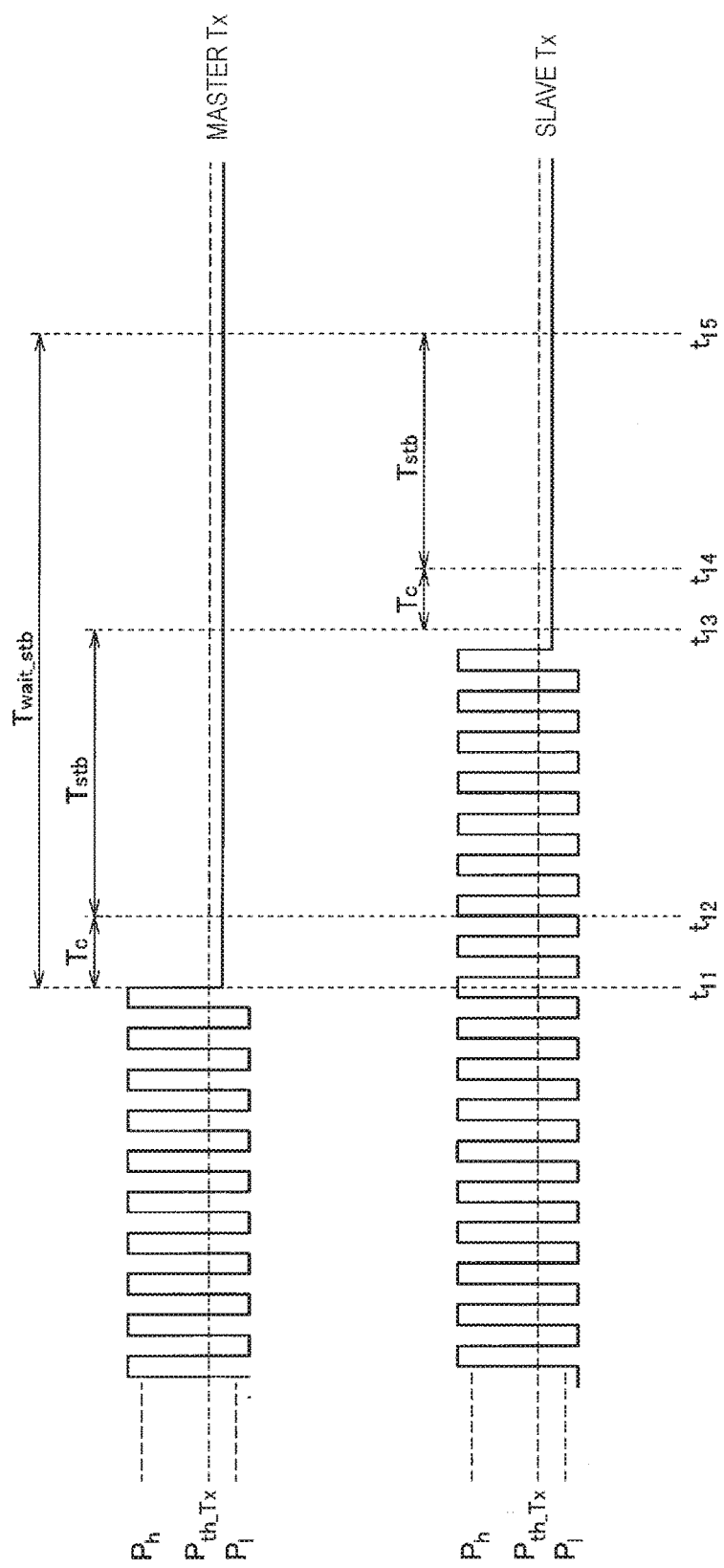
FIG. 9 is a timing chart in a case where the transition from active state to standby state is possible.

FIG. 9 is a timing chart illustrating an example of a signal that is output from the Tx ch of each communication device in the case where the transition from the active state to the standby state is possible. The transmission of the standby transition request signal is started at time t11 from the master device (e.g., video recorder) that is in the active state to the slave device (e.g., TV) that is in the active state.

The slave device determines that the standby transition request signal is received at time t13 after the lapse of the predetermined time $T_{stb}$ from time t12 at which the time Tc necessary for the signal falling of the signal has elapsed from time t11, and then starts transmission of the standby transition acceptance signal.

The master device determines that the standby transition acceptance signal is received at time t15 after the lapse of the predetermined time $T_{stb}$ from time t14 at which the time Tc necessary for the signal rising has elapsed from time t13, and then both the master device and the slave device transition to the standby state.

Figure 10:
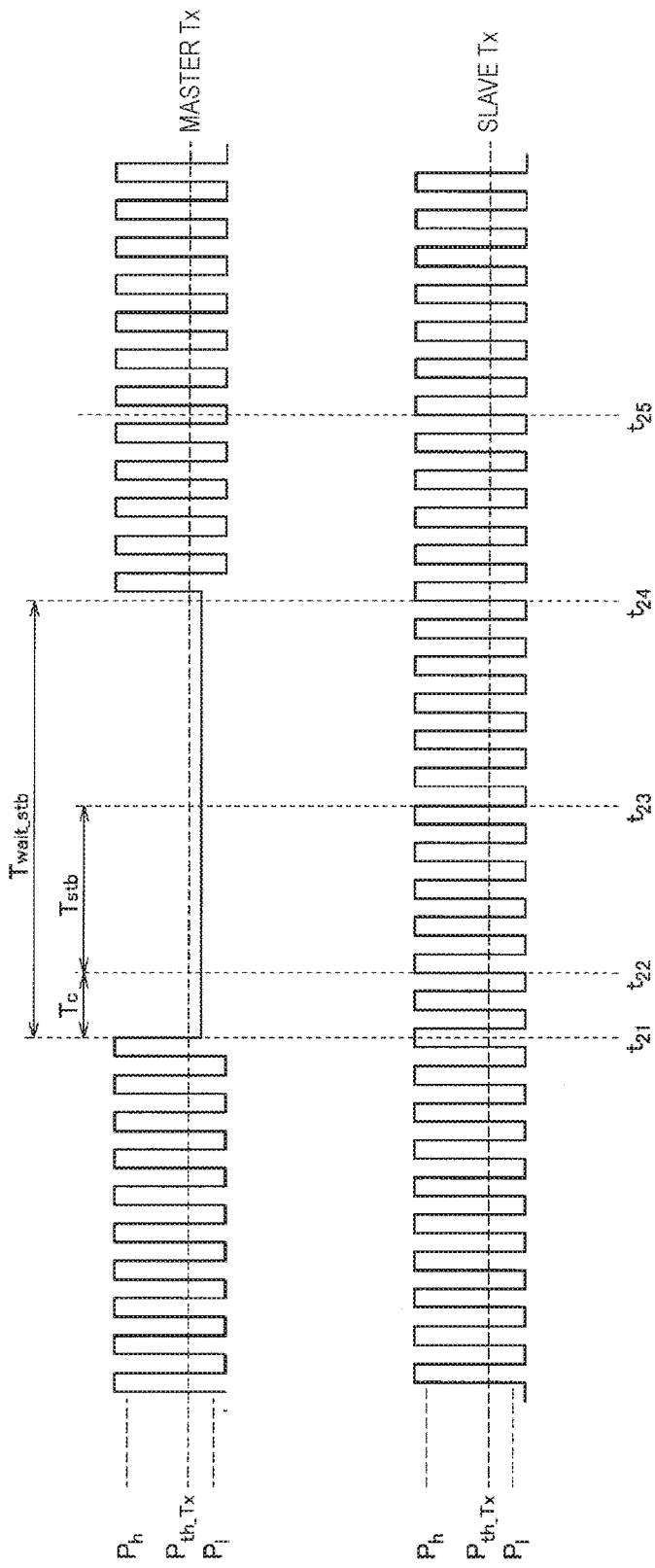
FIG. 10 is a timing chart in a case where the transition from active state to standby state is not possible.

FIG. 10 is a timing chart illustrating an example of a signal that is output from the Tx ch of each communication device in a case where the transition from the active state to the standby state is not possible. The transmission of the standby transition request signal is started at time t21 from the master device that is in the active state to the slave device that is in the active state.

The slave device determines that the standby transition request signal is received at time t23 after the lapse of the predetermined time $T_{stb}$ from the time t22 at which the time Tc necessary for the signal falling has elapsed from the time t21. However, the slave device determines that the transition to the standby state is not possible, and does not transmit the standby transition acceptance signal.

The master device cancels the transition to the standby state and restarts outputting the signal at time t24 after the lapse of the predetermined waiting time $T_{wait\_stb}$ from time t21, and the normal signal is outputted from time t25 when the training of the output signal is completed.

3-3. Transition to Active State

The example of the transition operation from the active state to the standby state is described above. Next, an example of the transition operation (Case 2 in FIG. 2) from the standby state to the active state will be described with reference to FIGS. 11 to 14.

First, conditions under which the transition from the active state to the standby state is performed are defined. In a case where at least one of the following two conditions is satisfied, the transition from the standby state to the active state is performed.

Condition 1: Detection of active transition request signal from opposite Tx ch by Rx ch of substream link in standby state Condition 2: Implementation-dependent condition. In one example, instruction or the like to perform transition to standby state Further, the communication device 10, which receives the active transition request signal at the time of the transition to the active state, outputs the active transition acceptance signal (Accept Activation Response) from the Tx ch if the transition to the active state is possible. The active transition acceptance signal is defined as follows, in one example, for each of the Tx ch and the Rx ch in consideration of a loss caused by a cable or the like used for connection.

The active transition acceptance signal that is output from the Tx ch of the substream link is an optical signal having the average power equal to or more than the $P_{th\_Tx}$, which continues during $T_{act}$. In addition, the active transition acceptance signal that is input to the Rx ch of the substream link is an optical signal having the average power equal to or more than the $P_{th\_Tx}$, which continues during $T_{act}$.

Here, the Tx ch of the opposite communication device corresponding to the communication device that outputs the active transition request signal continues to transmit the average power equal to or more than the $P_{th\_Tx}$, which continues during $T_{wait\_act}$ to the opposite Rx ch of the substream link.

In a case where the active transition acceptance signal is not received from the opposite Tx ch of the substream during $T_{wait\_act}$, the opposite communication device considers that the transition to the active state transition is rejected and then the transition to the active state is canceled. Here, $T_{wait\_act}$ is the upper limit time (e.g., 1300 ms) for the communication device that has outputted the active transition request signal to wait for reception of the active transition acceptance signal from the opposite communication device. The outputting of the power equal to or more than the $P_{th\_Tx}$ during $T_{wait\_act}$ is equivalent to outputting the active transition request signal a plurality of times continuously.

Figure 11:
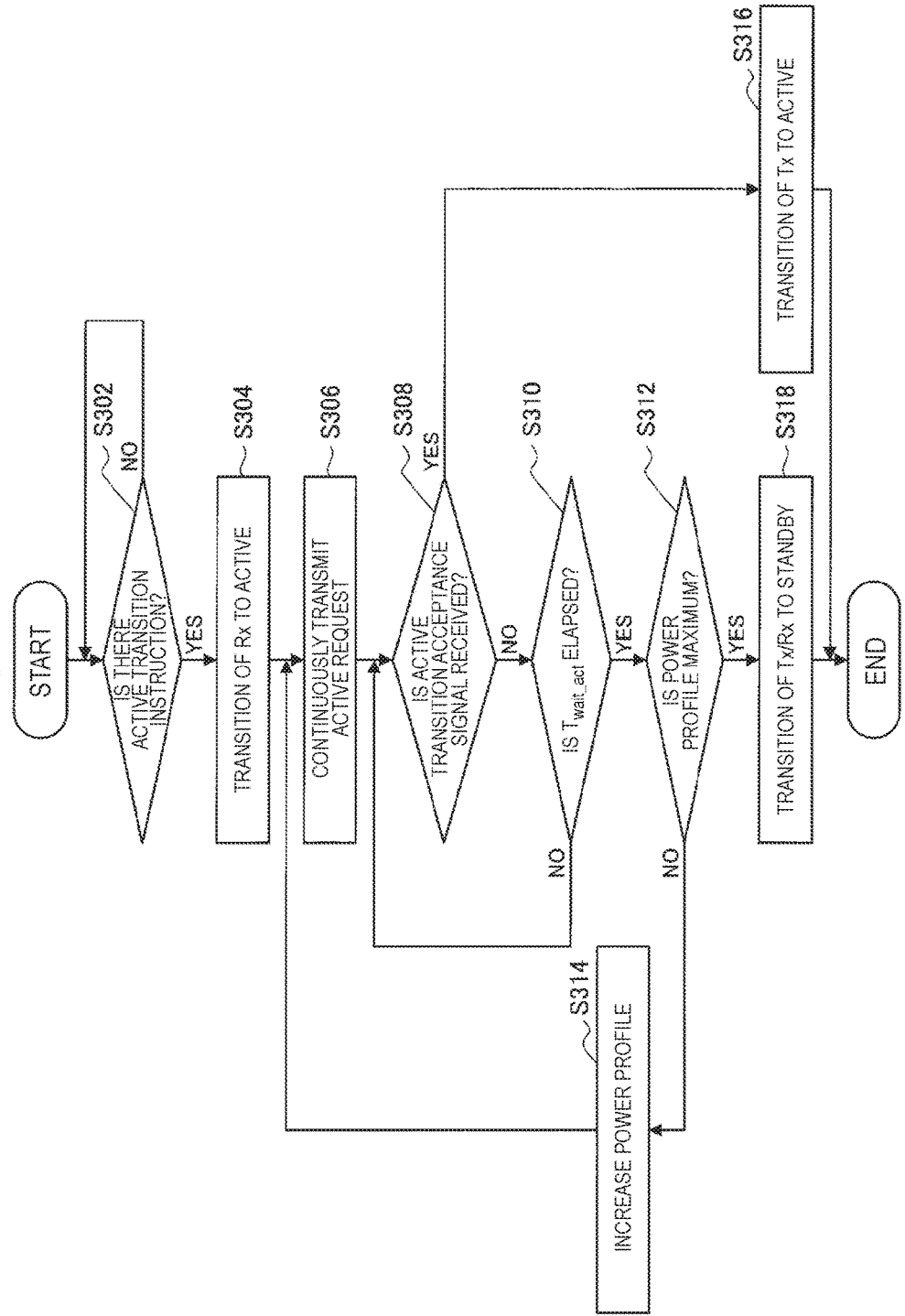
FIG. 11 is a flowchart illustrating an example of an operation procedure according to the present embodiment.

FIG. 11 is a flowchart illustrating an example of an operation procedure in a case where the transition to the active state is performed by an active transition instruction from the user. First, the communication device 10 continues to wait for the active transition instruction from the user (S302). If there is the active transition instruction from the user (YES in S302), the communication device 10 causes the Rx ch of the substream link to transition to the active state (S304). Furthermore, the communication device 10 continues to transmit the active transition request signal from the Tx ch of the substream link to the opposite communication device (S306).

Subsequently, the communication device 10 waits for the active transition acceptance signal from the opposite communication device (S308). In the case where the active transition acceptance signal is not received even after the lapse of the predetermined waiting time $T_{wait\_act}$ (NO in S308 and YES in S310), the communication device 10 increases the power supply value of the power profile until the power profile becomes the maximum (S316), and repeats steps S306 to S314. In the case where the active transition acceptance signal is not received even if the power profile is the maximum (YES in S312), the communication device 10 cancels the transition to the active state, and causes the Rx ch and the Tx ch of the substream link to transition to the standby state.

On the other hand, in the case where the communication device 10 receives the active transition acceptance signal within the predetermined waiting time $T_{wait\_act}$ (YES in S308), the communication device 10 causes the Tx ch of the substream link to transition to the active state (S316).

Figure 12:
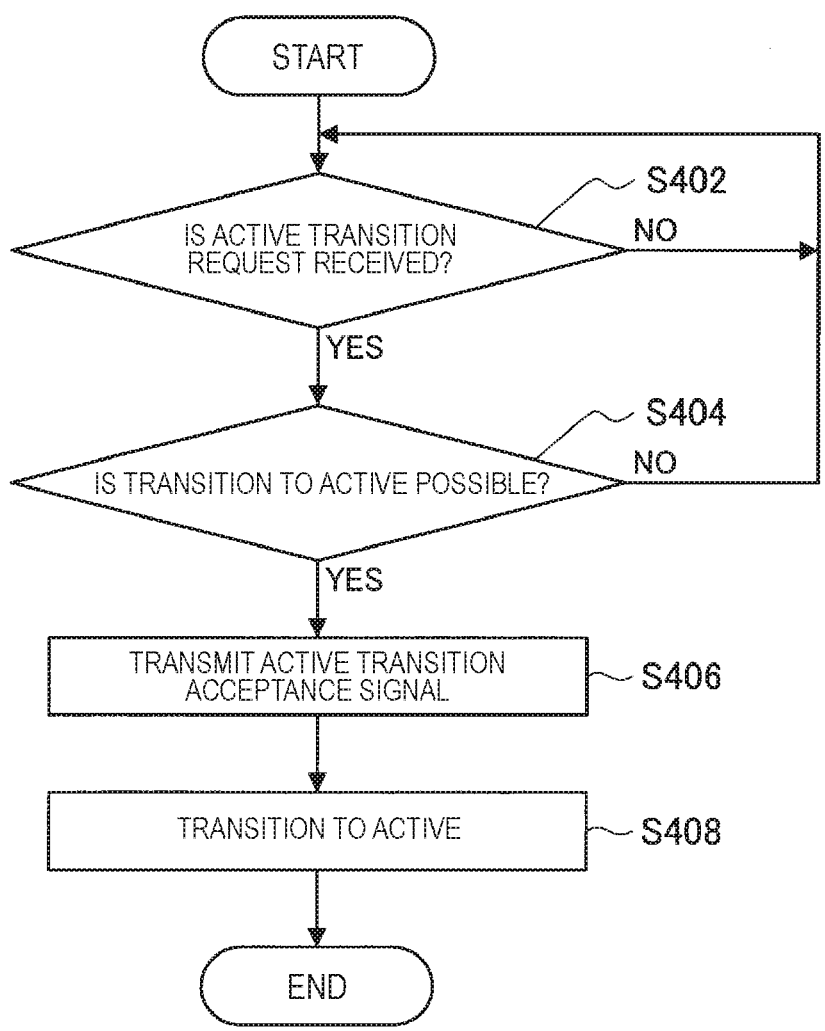
FIG. 12 is a flowchart illustrating an example of an operation procedure according to the present embodiment.

FIG. 12 is a flowchart illustrating an example of an operation procedure in the case where the transition to the active state is performed by the active transition request signal from the opposite communication device. First, the communication device 10 continues to wait for reception of the active transition request signal from the opposite communication device (S402). The communication device 10, when receiving the active transition request signal from the opposite communication device (YES in S402), determines whether the transition to the active state is possible (S404). In the case where the transition to the active state is not possible (NO in S404), the communication device 10 does not transmit the active transition acceptance signal to the opposite communication device and does not perform the transition to the active state. On the other hand, in the case where the transition to the active state is possible (YES in S404), the communication device 10 transmits the active transition acceptance signal to the opposite communication device (S406). Subsequently, the communication device 10 performs the transitions to the active state (S408).

Figure 13:
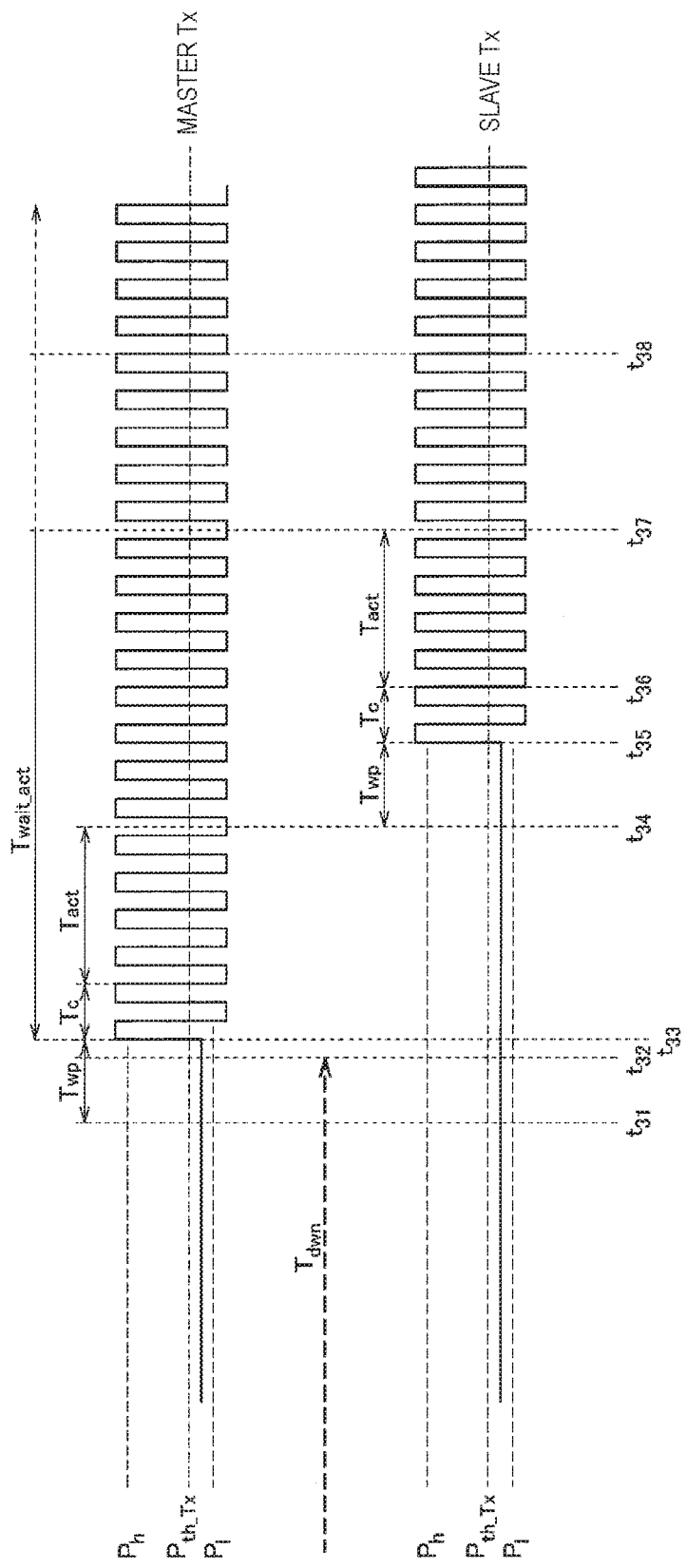
FIG. 13 is a timing chart in a case where the transition from standby state to active state is possible.

FIG. 13 is a timing chart illustrating an example of a signal that is output from the Tx ch of each communication device in the case where the transition from the standby state to the active state is possible. The master device (e.g., video recorder) that is in the standby state starts performing the transition to the active state at time t31. Furthermore, the master device starts transmitting the active transition request signal to the slave device (e.g., TV) that is in the standby state at time t33 when the activation time $T_{wp}$ of the analog front-end has elapsed from time t31.

On the other hand, the detector 110 of the slave device is in a state capable of detecting the optical signal at time t32 when the intermittent non-operation time $T_{dwn}$ has elapsed from the previous intermittent operation.

At time t34 when the time Tc necessary for the signal rising and the predetermined time $T_{act}$ have elapsed from time t33, the slave device determines that the active transition request signal is received and starts transmitting the active transition acceptance signal.

At time t37 after the lapse of the predetermined time $T_{act}$ from time t36 when the time Tc necessary for the signal rising has elapsed from time t35 at which the analog front-end activation time $T_{wp}$ has elapsed from time t34, the master device determines that the active transition acceptance signal is received. Both the master device and the slave device transition to the active state, and after time t38 when the training of the output signal is completed, normal signals are output from the master device and the slave device.

Figure 14:
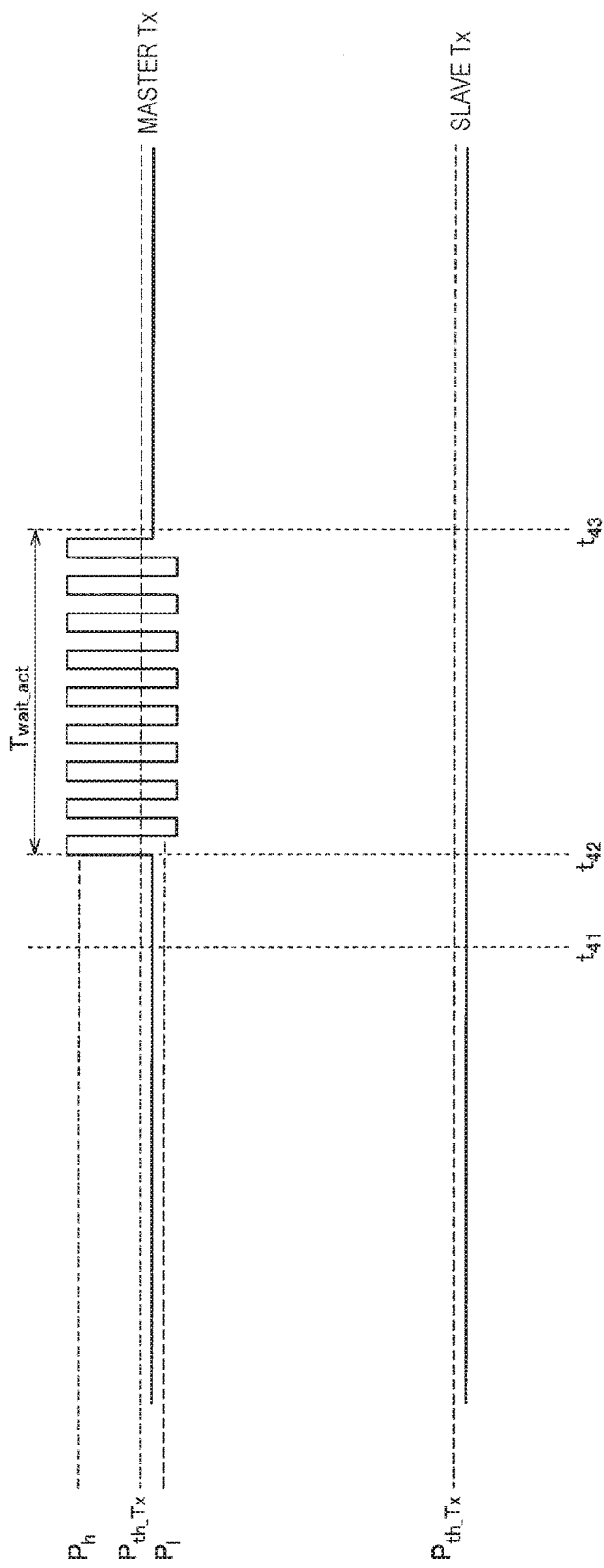
FIG. 14 is a timing chart in a case where the transition from standby state to active state is not possible.

FIG. 14 is a timing chart illustrating an example of a signal that is output from the Tx ch of each communication device in the case where the transition from the standby state to the active state is not possible. The master device that is in the standby state starts the transition to the active state at time t41. Furthermore, the master device starts transmission of the active transition request signal to the slave device in the battery exhaustion state at time t42 when the activation time $T_{wp}$ of the analog front-end has elapsed from time t41.

However, the slave device is in the battery exhaustion state, so the active transition acceptance signal fails to be transmitted. At time t43 after the lapse of the predetermined waiting time $T_{wait\_act}$ from time t42, the master device cancels the transition to the active state and performs the transition to the standby state. Moreover, in the case where the master device is supplying power to the slave device via the optical IF cable, the master device increases the power supply value by changing the power profile as described with reference to FIG. 11, and then may retry (transmission of the active transition request signal).

3-4. Specific Example

The example of the transition operation between the standby state and the active state according to the present embodiment is described above. Subsequently, a specific application example (specific example) of the present embodiment will be described with reference to FIG. 15 to FIG. 18. FIGS. 15 to 18 are diagrams illustrated to describe a specific example of the present embodiment.

Moreover, a TV (television set) 50, a video recorder 60, and a tablet PC 70 illustrated in FIGS. 15 to 18 are information processing devices having the communication device (optical IF) according to the present embodiment described above.

Figure 15:
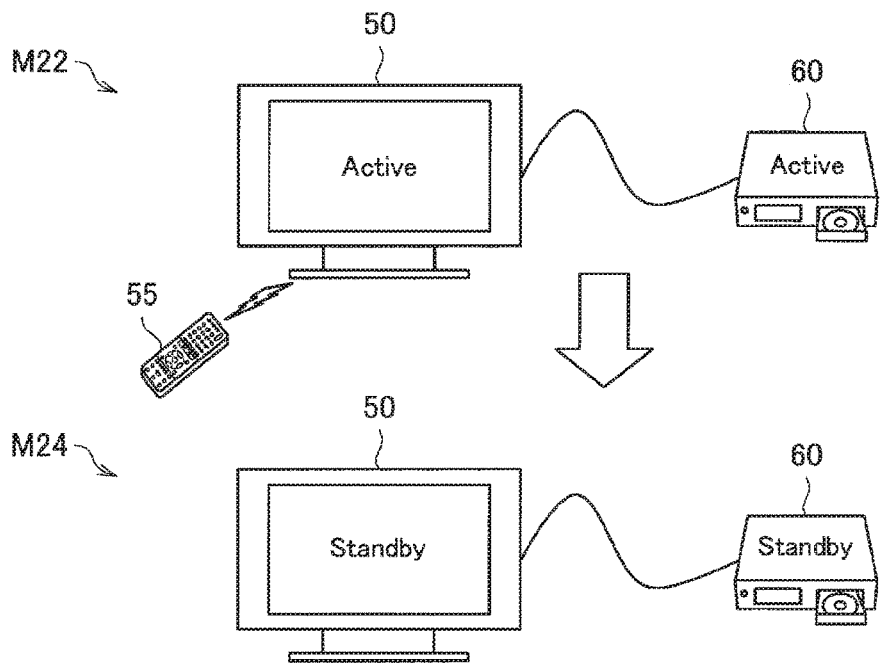
FIG. 15 is a diagram illustrated to describe a specific example of the present embodiment.

In the example illustrated in FIG. 15, when the user issues a standby transition instruction using a remote controller 55 of the TV 50 (state M22), a standby transition request signal is transmitted from the optical IF of the TV 50 to the optical IF of the video recorder 60. Then, the optical IF of the TV 50 and the optical IF of the video recorder 60, which is connected to the TV 50 by the optical IF cable, transition to the standby state (state M24).

In the state M24, the TV 50 may display, in one example, broadcasting content, or may be a state in which no screen display is output, and the video recorder 60 may record, in one example, terrestrial broadcasting, or may be in a state in which no operation is performed.

Figure 16:
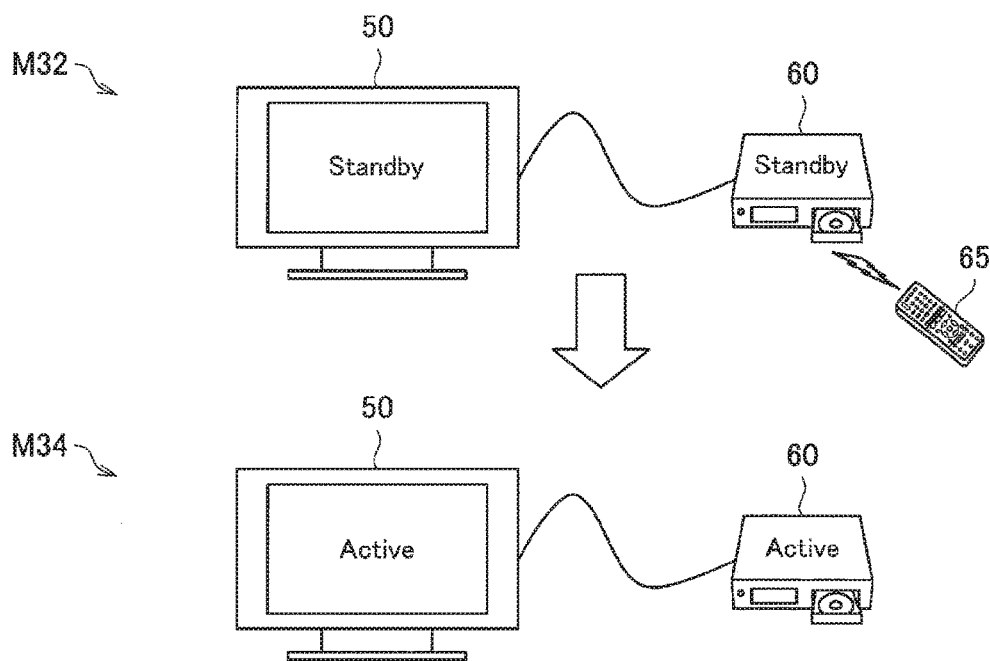
FIG. 16 is a diagram illustrated to describe a specific example of the present embodiment.

In the example illustrated in FIG. 16, when the user issues an active transition instruction using a remote controller 65 of the video recorder 60 (state M32), an active transition request signal is transmitted from the optical IF of the video recorder 60 to the optical IF of the TV 50. Then, the optical IF of the video recorder 60 and the optical IF of the TV 50, which is connected to the video recorder 60 by the optical IF cable, transition to the active state (state M34).

In the state M34, the TV 50 may display, in one example, an image transmitted from the video recorder 60, and the video recorder 60 may transmit, in one example, the menu screen of the video recorder 60 to the TV.

Figure 17:
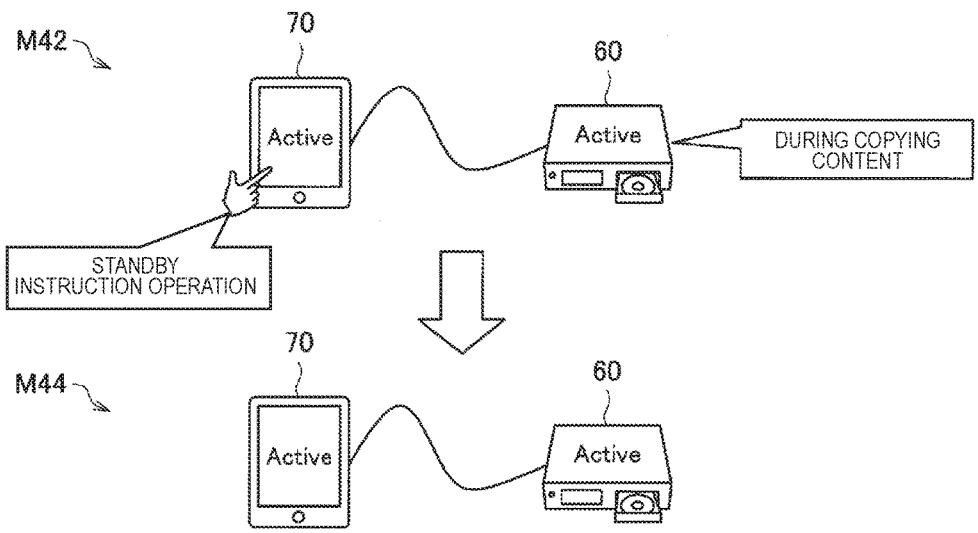
FIG. 17 is a diagram illustrated to describe a specific example of the present embodiment.

In the example illustrated in FIG. 17, when the user operates the tablet PC 70 and issues a standby transition instruction, the video recorder 60 connected to the tablet PC 70 is copying the recorded content of the video recorder 60 to the tablet PC 70 (State M42). Then, the standby transition request signal transmitted from the optical IF of the tablet PC 70 is rejected, and the optical IFs of the tablet PC 70 and the video recorder 60 maintain their active states (state M44).

In the state M44, in one example, the tablet PC 70 may erase the screen display, and the video recorder 60 may continue to transfer the recorded content.

Figure 18:
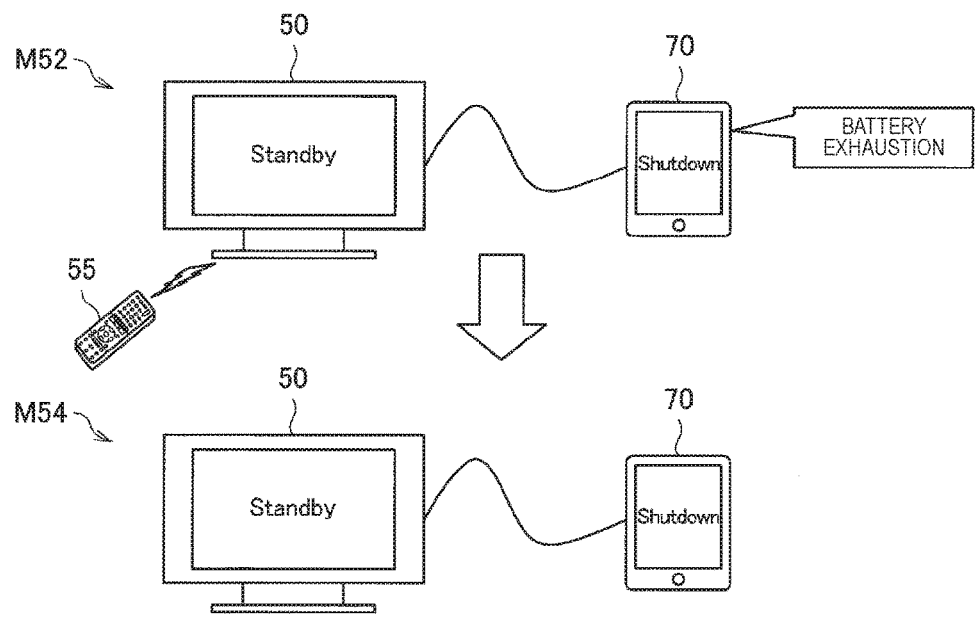
FIG. 18 is a diagram illustrated to describe a specific example of the present embodiment.

In the example illustrated in FIG. 18, when an active transition instruction is issued by the remote controller 55 of the TV 50, the tablet PC 70 connected to the TV 50 is in the shutdown state in which the battery is exhausted (state M52). Then, the tablet PC 70 fails to respond to the active transition request signal transmitted from the optical IF of the TV 50 (state M54). Moreover, in the state M54, the optical IF of the TV 50 maintains the standby state, but it may supply power with a high power supply value by the optical IF of the tablet PC 70 and retry (transmission of the active transition request signal). In addition, in the state M54, the TV 50 may display a message indicating that the connected equipment (the tablet PC 70) does not respond.

4. MODIFICATIONS

An embodiment of the present disclosure is described above. Modifications of the present embodiment will be described below. Moreover, the modifications described below may be applied instead of the configuration described in the present embodiment or may be additionally applied to the configuration described in the present embodiment.

4-1. Modification 1

The above description is given of the example in which the communication device 10 includes the controller 300 implemented by the CPU 350 or the like, and the operating state is controlled by the controller 300, but the present disclosure is not limited to this example. In one example, the functions of the controller described above may be implemented, in one example, by a system controller, a CPU, or the like of the host device (information processing device) 20.

4-2. Modification 2

Further, the above description is given of the example in which the transition between the active state and the standby state is controlled using the substream link, but the present disclosure is not limited to such example. In one example, the operating state of the communication device 10 described above may be controlled in a similar manner using the mainstream link. In addition, the transition between the active state and the standby state may be performed individually for each channel depending on the configuration of the implementation.

5. EXEMPLARY HARDWARE CONFIGURATION

An embodiment and each modification of the present disclosure are described above. The information processing such as the operating state control processing and the communication control processing of the communication device 10 described above is implemented by cooperation of software and hardware of the communication device 10, the host device 20, or the like. The exemplary hardware configuration of an information processing device 1000 will be described below as an example of a hardware configuration of the host device 20, the TV 50, the video recorder 60, the tablet PC 70, and the like which are the information processing device according to the present embodiment.

Figure 19:
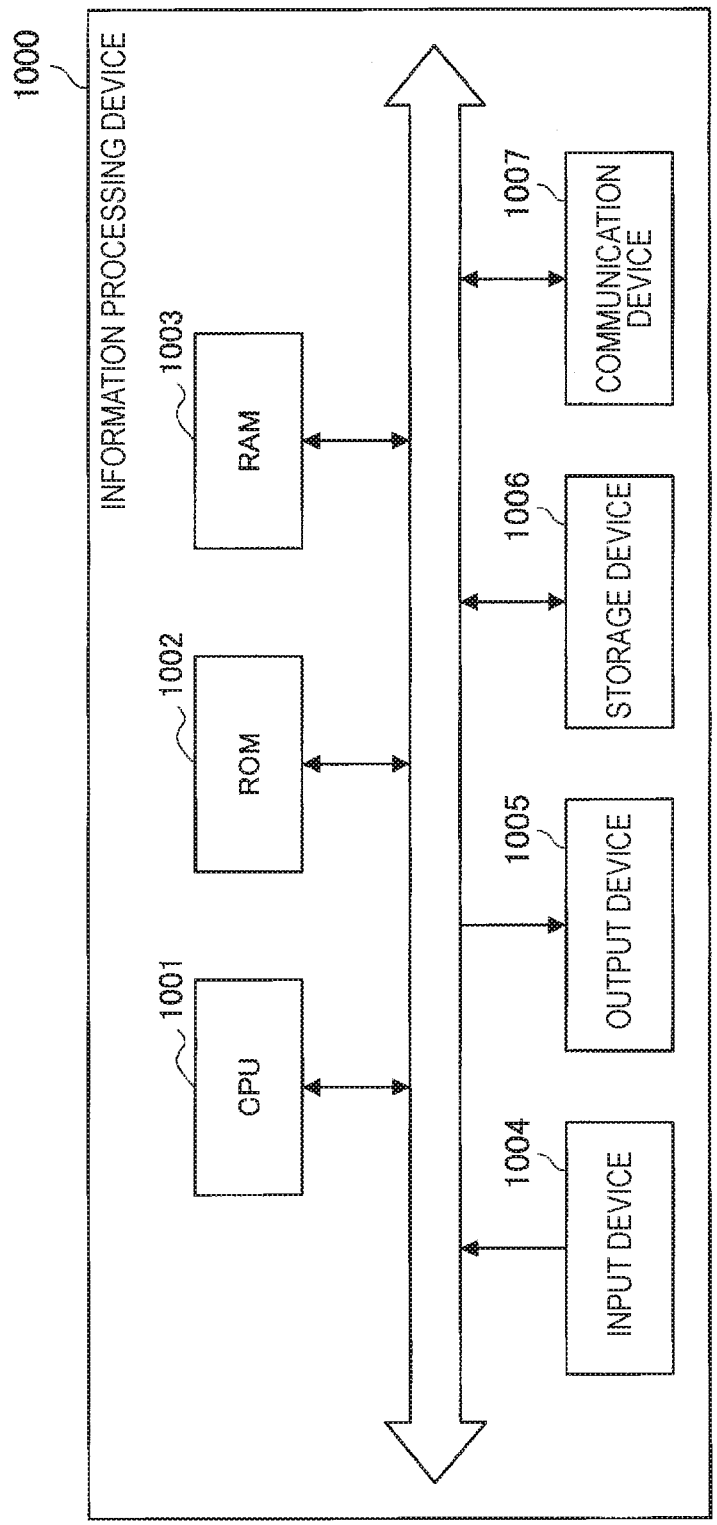
FIG. 19 is a diagram illustrated to describe a hardware configuration of an information processing device according to the present embodiment.

FIG. 19 is a diagram illustrated to describe a hardware configuration of the information processing device 1000 according to the present embodiment. As illustrated in FIG. 19, the information processing device 1000 includes a central processing unit (CPU) 1001, a read-only memory (ROM) 1002, a random-access memory (RAM) 1003, an input device 1004, an output device 1005, a storage device 1006, and a communication device 1007.

The CPU 1001 functions as an arithmetic processing unit and a control unit, and controls the overall operation in the information processing device 1000 in accordance with various programs. In addition, the CPU 1001 may be a microprocessor. The ROM 1002 stores programs, operation parameters, or the like used by the CPU 1001. The RAM 1003 temporarily stores programs to be used for execution of the CPU 1001, parameters that are changed as appropriate in the execution thereof, or the like. These components are connected to each other via a host bus including a CPU bus or the like. As described in the modification, the functions of the controller may be implemented by cooperation of software and the CPU 1001, the ROM 1002, and the RAM 1003.

The input device 1004 includes an input means, an input control circuit, or the like. The input means may be a mouse, a keyboard, a touch panel, a button, a microphone, a switch, and a lever, used for the user to input information. The input control circuit generates an input signal on the basis of an input by the user and outputs it to the CPU 1001. It is possible for the user of the information processing device 1000 to input various kinds of data to the information processing device 1000 or to instruct the information processing device 1000 to perform processing operations.

The output device 1005 includes, in one example, a display device such as a liquid crystal display (LCD) device, an OLED device, and a lamp. Furthermore, the output device 1005 includes a sound output device such as a speaker and a headphone. In one example, the display device displays a captured image, a generated image, or the like. On the other hand, the sound output device converts sound data or the like into sound and outputs it.

The storage device 1006 is a device used to store data. The storage device 1006 may include a storage medium, a recording device that records data in the storage medium, a reading device that reads data from the storage medium, a deletion device that deletes data recorded in the storage medium, and the like. The storage device 1006 stores programs executed by the CPU 1001 and various data.

The communication device 1007 is, in one example, a communication interface including a communication device or the like used for connection to a communication network. In addition, the communication device 1007 may include a wireless local area network (LAN) compatible communication device, a long-term evolution (LTE) compatible communication device, a wire communication device that performs wired communication, or a Bluetooth (registered trademark) communication device. The communication device 1007 corresponds to the communication device 10 according to the present embodiment described with reference to FIG. 3.

Moreover, as described with reference to FIG. 4, the communication device 10 may have hardware equivalent to the CPU 1001, the ROM 1002, the RAM 1003, and the like, similarly to the information processing device 1000.

6. CLOSING REMARKS

As described above, according to the embodiment of the present disclosure, the power consumption of the output is reduced in the standby state in which the communication is restricted. Furthermore, for the operation associated with signal reception for the transition from the standby state to the active state, it is sufficient that only a part of the receiver performs the intermittent operation, so it is possible to achieve a significant reduction in power consumption.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

In one example, each step in the above embodiment does not necessarily need to be processed in chronological order in accordance with the order described in the flowcharts. In one example, each step in the processing of the above embodiment may be processed in an order different from the order described in the flowcharts, or may be processed in parallel.

Further, according to the above embodiment, it is also possible to provide a computer program for causing the hardware such as the CPU 1001, the ROM 1002, and the RAM 1003 to implement the function similar to the controller 300 of the communication device 10 described above. A recording medium on which the computer program is recorded is also provided.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

A communication device including:

a detector configured to detect an optical signal and convert the optical signal to an electric signal;

a data processing unit configured to process the electric signal converted by the detector to acquire data; and a controller configured to control an operating state including a standby state in which the data processing unit is deactivated to reduce power consumption and an active state in which the data processing unit is capable of executing acquisition of the data on a basis of the optical signal detected by the detector, in which the detector detects the optical signal in the standby state.

(2)

The communication device according to (1), in which the detector performs an intermittent operation capable of detecting the optical signal at least every predetermined period of time in the standby state.

(3)

The communication device according to (1) or (2), in which the controller determines whether the optical signal is an active transition request signal for requesting the communication device to transition to the active state on a basis of an average power of the optical signal detected by the detector in the standby state, and in a case where the optical signal is determined to be the active transition request signal, the controller causes the communication device to transition from the standby state to the active state.

(4)

The communication device according to (3), in which the controller causes the active transition request signal to be transmitted to cause another communication device to transition from the standby state to the active state.

(5)

The communication device according to (4), in which, in a case where the optical signal detected by the detector in the standby state is determined to be the active transition request signal, the controller causes an active transition acceptance signal indicating that transition of the communication device to the active state is accepted to be transmitted.

(6)
The communication device according to (5),
in which, in a case where the active transition acceptance signal is not included in an optical signal detected by the detector within a predetermined waiting time after starting transmission of the active transition request signal, the controller causes the communication device to transition to the standby state.

(7)
The communication device according to any one of (3) to (6),
in which, in a case where the optical signal detected by the detector in the standby state is an optical signal having an average power more than or equal to a predetermined optical power, which continues for a predetermined time or longer, the controller determines that the optical signal is the active transition request signal.

(8)
The communication device according to any one of (3) to (7),
in which the controller prevents from causing the active transition request signal to be transmitted in the standby state.

(9)
The communication device according to any one of (3) to (8),
in which the detector further detects an optical signal in the active state, and
the controller determines whether the optical signal is an standby transition request signal for requesting the communication device to transition to the standby state on a basis of an average power of the optical signal detected by the detector in the active state, and in a case where the optical signal is determined to be the standby transition request signal, the controller causes the communication device to transition from the active state to the standby state.

(10)
The communication device according to (9),
in which the controller causes the standby transition request signal to be transmitted to cause another communication device to transition from the active state to the standby state.

(11)
The communication device according to (10),
in which, in a case where the optical signal detected by the detector in the active state is determined to be the standby transition request signal, the controller determines whether transition of the communication device to the standby state is possible, and in a case where the transition to the standby state is determined to be possible, the controller causes a standby transition acceptance signal indicating that the transition of the communication device to the standby state is accepted to be transmitted.

(12)
The communication device according to (11),
in which, in a case where the standby transition acceptance signal is included in an optical signal detected by the detector within a predetermined waiting time after starting transmission of the standby transition request signal, the controller causes the communication device to transition to the standby state.

(13)
The communication device according to any one of (9) to (12),
in which, in a case where the optical signal detected by the detector in the active state is an optical signal having an average power less than a predetermined optical power, which continues for a predetermined time or longer, the controller determines that the optical signal is the standby transition request signal.

(14)
An information processing device including:
a detector configured to detect an optical signal and convert the optical signal to an electric signal;
a data processing unit configured to process the electric signal converted by the detector to acquire data; and
a controller configured to control an operating state including a standby state in which the data processing unit is deactivated and an active state in which the data processing unit is capable of executing acquisition of the data on a basis of the optical signal detected by the detector,
in which the detector detects the optical signal in the standby state.

(15)
A communication method executed by a communication device including a detector configured to detect an optical signal and convert the optical signal to an electric signal and a data processing unit configured to process the electric signal converted by the detector to acquire data, the method including:
controlling an operating state including a standby state in which the data processing unit is deactivated and an active state in which the data processing unit is capable of executing acquisition of the data on a basis of the optical signal detected by the detector.

REFERENCE SIGNS LIST 10 communication device
220 host device
80A, 80B equipment
90 cable
100 receiver
110 detector
130 data processing unit
200 transmitter
300 controller

The invention claimed is:
1. A first communication device, comprising:
a detector configured to:
    detect a first optical signal in an active state of the first communication device; and
    convert the first optical signal to an electric signal;
a data processing unit configured to process the electric signal converted by the detector to acquire data; and
a controller configured to:
    determine the first optical signal is a first standby transition request signal to request the first communication device to transition from the active state of the first communication device to a standby state of the first communication device,
        wherein the determination that the first optical signal is the first standby transition request signal is based on an average power of the first optical signal detected by the detector in the active state of the first communication device; and
    control, based on the determination that the first optical signal is the first standby transition request signal, the first communication device to transition from the active state of the first communication device to the standby state of the first communication device, wherein
in the standby state of the first communication device, the data processing unit is deactivated to reduce power consumption, and
in the active state of the first communication device, the data processing unit is further configured to acquire the data based on the first optical signal detected by the detector.

2. The first communication device according to claim 1, wherein the detector is further configured to execute an intermittent operation to detect a second optical signal at least every determined period of time in the standby state of the first communication device.

3. The first communication device according to claim 2, wherein the controller is further configured to:
determine the second optical signal is a first active transition request signal to request the first communication device to transition from the standby state of the first communication device to the active state of the first communication device,
wherein the determination that the second optical signal is the first active transition request signal is based on an average power of the second optical signal detected by the detector in the standby state of the first communication device; and
control, based on the determination that the second optical signal is the first active transition request signal, the first communication device to transition from the standby state of the first communication device to the active state of the first communication device.

4. The first communication device according to claim 3, further comprising a transmitter, wherein
the controller is further configured to control the transmitter to transmit a second active transition request signal to a second communication device, and
the second communication device transitions from a standby state of the second communication device to an active state of the second communication device based on the second active transition request signal.

5. The first communication device according to claim 4, wherein
the controller is further configured to control the transmitter to transmit a first active transition acceptance signal indicating that the transition of the first communication device from the standby state of the first communication device to the active state of the first communication device is accepted, and
the transmission of the first active transition acceptance signal is based on the determination that the second optical signal is the first active transition request signal.

6. The first communication device according to claim 5, wherein, in a case where a second active transition acceptance signal is excluded from a third optical signal detected by the detector, the controller is further configured to control the first communication device to transition from the active state of the first communication device to the standby state of the first communication device, and
the third optical signal is detected by the detector within a determined waiting time after a start of the transmission of the second active transition request signal.

7. The first communication device according to claim 3, wherein
the average power of the second optical signal is more than or equal to a determined optical power,
the detector is further configured to detect the second optical signal for a determined time or longer, and the controller is further configured to determine the second optical signal is the first active transition request signal based on the detection of the second optical signal for the determined time or longer.

8. The first communication device according to claim 3, wherein the controller is further configured to prevent transmission of a second active transition request signal in the standby state of the first communication device.

9. The first communication device according to claim 1, further comprising a transmitter, wherein
the controller is further configured to control the transmitter to transmit a second standby transition request signal to a second communication device, and
the second communication device transitions from an active state of the second communication device to a standby state of the second communication device based on the second standby transition request signal.

10. The first communication device according to claim 9, wherein the controller is further configured to:
determine, based on the determination that the first optical signal is the first standby transition request signal, a possibility of the transition of the first communication device from the active state of the first communication device to the standby state of the first communication device; and
control, based on the determined possibility, the transmitter to transmit a first standby transition acceptance signal indicating that the transition of the first communication device from the active state of the first communication device to the standby state of the first communication device is accepted.

11. The first communication device according to claim 10, wherein, in a case where a second standby transition acceptance signal is included in a third optical signal detected by the detector, the controller is further configured to control the first communication device to transition from the active state of the first communication device to the standby state of the first communication device, and
the third optical signal is detected by the detector within a determined waiting time after a start of the transmission of the second standby transition request signal.

12. The first communication device according to claim 1, wherein
the average power of the first optical signal is less than a determined optical power,
the detector is further configured to detect the first optical signal for a determined time or longer, and
the controller is further configured to determine the first optical signal is the first standby transition request signal based on the detection of the first optical signal for the determined time or longer.

13. An information processing device, comprising:
a detector configured to:
detect an optical signal in an active state of the information processing device; and
convert the optical signal to an electric signal;
a data processing unit configured to process the electric signal converted by the detector to acquire data; and
a controller configured to:
determine the optical signal is a standby transition request signal to request the information processing device to transition from the active state to a standby state of the information processing device,
wherein the determination that the optical signal is the standby transition request signal is based on an average power of the optical signal detected by the detector in the active state; and control, based on the determination that the optical signal is the standby transition request signal, the information processing device to transition from the active state to the standby state, wherein
  in the standby state, the data processing unit is deactivated, and
  in the active state, the data processing unit is further configured to acquire the data based on the optical signal detected by the detector.

14. A communication method, comprising:

in a communication device including a detector, a data processing unit, and a controller:

detecting, by the detector, an optical signal in an active state of the communication device;

converting, by the detector, the optical signal to an electric signal;

processing, by the data processing unit, the electric signal converted by the detector to acquire data;

determining, by the controller, the optical signal is a standby transition request signal to request the communication device to transition from the active state to a standby state of the communication device, wherein the determination that the optical signal is the standby transition request signal is based on an average power of the optical signal detected by the detector in the active state; and controlling, by the controller, the communication device to transition from the active state to the standby state, wherein the controlling of the communication device is based on the determination that the optical signal is the standby transition request signal, in the standby state, the data processing unit is deactivated, and in the active state, the data processing unit is further configured to acquire the data based on the optical signal detected by the detector.

* * * * *